(12) United States Patent
McCune et al.

(10) Patent No.: US 8,832,778 B2
(45) Date of Patent: Sep. 9, 2014

(54) METHODS AND APPARATUSES FOR USER-VERIFIABLE TRUSTED PATH IN THE PRESENCE OF MALWARE

(75) Inventors: Jonathan M. McCune, Pittsburgh, PA (US); Adrian M. Perrig, Pittsburgh, PA (US); Anupam Datta, Pittsburgh, PA (US); Virgil D. Gligor, Pittsburgh, PA (US); Ning Qu, San Jose, CA (US)

(73) Assignee: Carnegie Mellon University, Pittsburg, PA (US)

( * ) Notice: Subject to any disclaimer, the term of this patent is extended or adjusted under 35 U.S.C. 154(b) by 0 days.

(21) Appl. No.: 13/389,212

(22) PCT Filed: Jun. 29, 2010

(86) PCT No.: PCT/US2010/040334
§ 371 (c)(1),
(2), (4) Date: Apr. 18, 2012

(87) PCT Pub. No.: WO2011/037665
PCT Pub. Date: Mar. 31, 2011

(65) Prior Publication Data
US 2012/0198514 A1 Aug. 2, 2012

Related U.S. Application Data

(60) Provisional application No. 61/273,448, filed on Aug. 4, 2009.

(51) Int. Cl.
*G06F 21/00* (2013.01)
*G06F 21/57* (2013.01)
(52) U.S. Cl.
CPC ...................................... *G06F 21/57* (2013.01)
USPC .................................................. 726/1; 726/2

(58) Field of Classification Search
CPC ........................................................ G06F 21/57
USPC .................................................. 726/1; 713/2
See application file for complete search history.

(56) References Cited

U.S. PATENT DOCUMENTS 4,945,468 A * 7/1990 Carson et al. ................... 726/15
8,374,354 B2 * 2/2013 Berggren ....................... 380/279
(Continued)

OTHER PUBLICATIONS

Bashun, "Too Young to be secure: Analysis of UEFI threats and Vulnerabilities", 2013, IEEE, p. 16-24.*

(Continued)

*Primary Examiner* — Mohammad L Rahman
*Assistant Examiner* — Gregory Lane
(74) *Attorney, Agent, or Firm* — Fox Rothschild LLP; Dennis M. Carleton

(57) ABSTRACT

An apparatus and method for establishing a trusted path between a user interface and a trusted executable, wherein the trusted path includes a hypervisor and a driver shim. The method includes measuring an identity of the hypervisor; comparing the measurement of the identity of the hypervisor with a policy for the hypervisor; measuring an identity of the driver shim; comparing the measurement of the identity of the driver shim with a policy for the driver shim; measuring an identity of the user interface; comparing the measurement of the identity of the user interface with a policy for the user interface; and providing a human-perceptible indication of whether the identity of the hypervisor, the identity of the driver shim, and the identity of the user interface correspond with the policy for the hypervisor, the policy for the driver shim, and the policy for the user interface, respectively.

29 Claims, 22 Drawing Sheets

(56) References Cited

U.S. PATENT DOCUMENTS

| | | | |
|---|---|---|---|
| 2002/0099952 A1* | 7/2002 | Lambert et al. | 713/200 |
| 2006/0253705 A1 | 11/2006 | Roberts et al. | |
| 2006/0253706 A1 | 11/2006 | Roberts et al. | |
| 2008/0077994 A1* | 3/2008 | Comlekoglu | 726/27 |
| 2009/0028078 A1* | 1/2009 | Balabine et al. | 370/310 |
| 2009/0113425 A1* | 4/2009 | Ports et al. | 718/1 |
| 2009/0133097 A1* | 5/2009 | Smith et al. | 726/1 |
| 2009/0144582 A1* | 6/2009 | Li et al. | 714/6 |
| 2009/0216729 A1* | 8/2009 | Kester et al. | 707/3 |
| 2009/0249053 A1* | 10/2009 | Zimmer et al. | 713/2 |
| 2011/0016467 A1* | 1/2011 | Kane | 718/1 |

OTHER PUBLICATIONS

McCune, J., et al., Efficient TCB Reduction and Attestation, CMU-CyLab-09-003, Mar. 2009.

McCune, J., Reducing the Trusted Computing Base for Applications on Commodity Systems, PhD Dissertation, Carnegie Mellon University, 2009.

Garfinkel, T., Terra: A Virtual Machine-Based Platform for Trusted Computing, ACM SOSP, Oct. 22, 2003, pp. 193-206.

Microsoft: Hardware Platform for the Next-Generation Secure Computing Base, Internet Citation, Aug. 29, 2009.

Garfinkel, T: "Terra: a A Virtual Machine-Based Platform for Trusted Computing", ACM SOSP. Proceedings of the ACM Symposium on Operating Systems Princles, Oct. 22, 2003.

Microsoft: "Hardware Platform for the Next-Generation Secure Computing Base", Internet Citation, 2003 http://www.microsoft.com/resource/ngscb/documents/NGSCBhardware.doc.

* cited by examiner

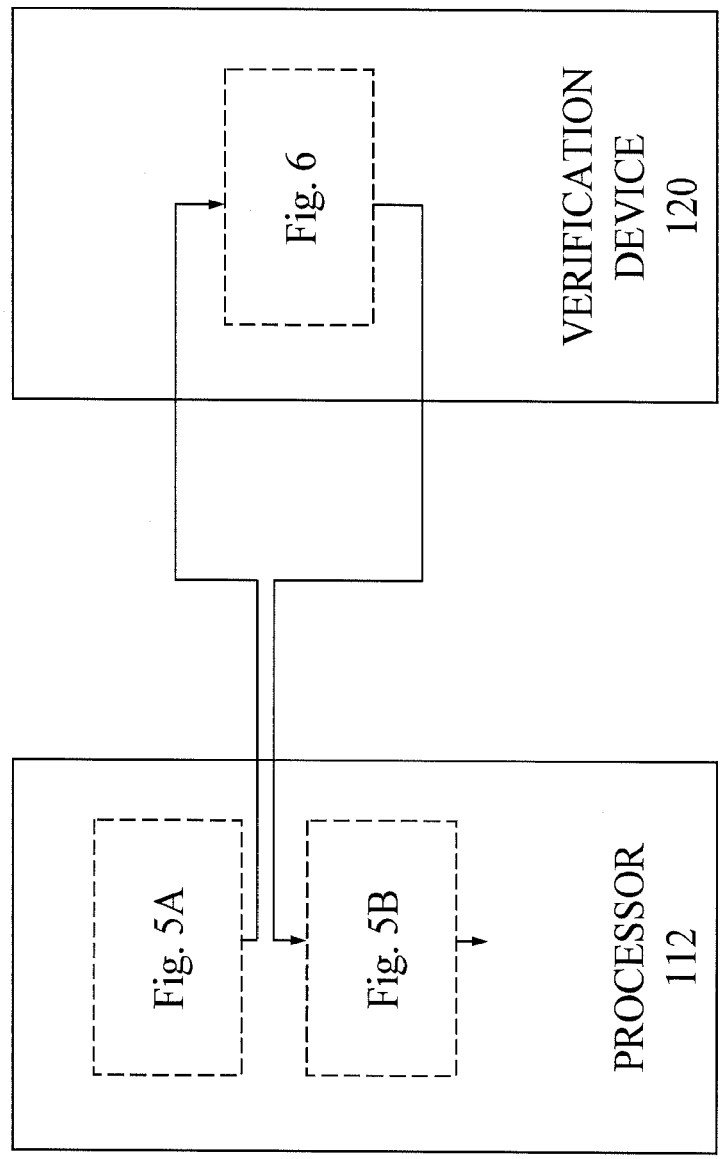

$TrustVisor \rightarrow TrustedVerifier: \langle Request\_Challenge \rangle$
$TrustedVerifier \rightarrow TrustVisor: \langle Challenge \rangle$
$TrustVisor: Checksum = Checksum\_func(Verification function, Challenge)$
$TrustVisor \rightarrow TrustedVerifier: \langle Checksum \rangle$
$TrustVisor: Hash = Hash\_func(TrustVisor)$
$TrustVisor \rightarrow TrustedVerifier: \langle Hash \rangle$

Fig. 19

1. $V$: $t_1 \leftarrow$ current time, $nonce \xleftarrow{R} \{0,1\}^n$
   $V \rightarrow P$: $\langle nonce \rangle$
2. $P$: $c \leftarrow$ Checksum($nonce, P$)
3. $P \rightarrow V$: $\langle c \rangle$
   $V$: $t_2 \leftarrow$ current time
   if ($t_2 - t_1 > \Delta t$) then exit with failure
   else verify checksum $c$
4. $P$: $h \leftarrow$ Hash($nonce, E$)
5. $P \rightarrow V$: $\langle h \rangle$
   $V$: verify measurement result $h$
6. $P$: transfer control to $E$
7. $E \rightarrow V$: $\langle$result (optional)$\rangle$

Fig. 22

METHODS AND APPARATUSES FOR USER-VERIFIABLE TRUSTED PATH IN THE PRESENCE OF MALWARE

CROSS-REFERENCE TO RELATED APPLICATIONS

This application claims priority from U.S. Provisional Patent Application No. 61/273,448, filed Aug. 4, 2009, which is incorporated herein by reference. This application is related to U. S. non-provisional patent application Ser. No. 12/720,008, filed Mar. 9, 2010, U.S. provisional patent application No. 61/273,454, filed Aug. 4, 2009, and U. S. patent application Ser. No. 11/545,924, filed Oct. 10, 2006.

STATEMENT REGARDING FEDERALLY-SPONSORED RESEARCH AND DEVELOPMENT

This invention may have been made with government support under contracts DAAD19-02-1-0289 and W911NF-09-1-0273, both awarded by the ARO. The United States government may have certain rights in this invention.

FIELD OF THE INVENTION

The present invention is directed generally to methods and apparatuses for a user-verifiable trusted path in the presence of malware and, more particularly, for such methods and apparatuses for use on untrusted computer platforms.

BACKGROUND OF THE INVENTION

A fundamental construct in secure computing is that of a Trusted Path (TP) [37, 38]. In general, a TP is a high-assurance connection between a computing device and a human. For example, the human can gain assurance that their interaction's with the computer's interface is connected with the intended software on the computing device, and not a malicious look-alike. In contrast, a trusted channel (TC) is an authenticated, integrity-protected, and encrypted connection between two computing devices. The traditional notion of a TP enables a user to communicate from a trusted input device (e.g., a keyboard) in a direct, unmediated manner with a set of trusted commands (implemented by a security kernel or a trusted application). In turn, the trusted commands upon execution display a distinct prompt on the user's terminal that enables the user to verify the activation of the TP. The prototypical example of the use of such a TP is for a secure login application. However, the need for trusted paths is fundamental to security and arises in many other contexts. For example, a trusted path is essential to ensure that the web address of a bank entered by a user is not altered before it reaches the web browser on the user's machine, or that the password for the bank's web site is not revealed to malware residing on the user's machine. Similarly, a trusted path would enable an application to display its output on a user's device with the assurance that its output is not surreptitiously read or modified by malware. From a user's perspective, application output via a trusted path would help assure the user that an application's output is secret and authentic.

A trusted path provides certain basic properties: confidentiality and integrity of exchanged data, authentication of the entities at the two ends of the path, and timely execution of commands (a form of availability) over the trusted path. In addition, a TP should provide three fundamental properties: (1) A TP should be extensible. This means that a user can add additional trusted commands to the TP and remove others, depending upon the needs, sensitivity and integrity requirements of the application area. (2) The TP should be persistent. This means that the user can be assured that the trusted path will always exist. In addition, we can require a stronger property—user-verifiability—that enables the user to verify that the TP is activated at any point. (3) The TP should be recoverable after system compromise. This means that the user can always recover the TP, e.g., by rebooting the security kernel from a trusted source.

Traditionally, the existence of a TP that satisfied all of these properties was predicated on (a) the existence of a penetration-free, security kernel (i.e., non-circumventable, isolated, and verifiable kernel)—the trusted computing base (TCB), and (b) an environment free of malicious software and insiders, who could potentially modify the kernel. The first commercially available secure Unix-style system providing trusted paths was designed by Gligor et al. in Secure Xenix in the 1980's [20, 22]. In today's computing environment, however, neither of these assumptions are reasonable for commercial off-the-shelf operating systems used in large enterprises, where insider attacks represent a significant security risk. Furthermore, connecting such systems to the Internet all but guarantees the presence of malware with full access to all system code and data. (At present, an unprotected host connected to the Internet is infected within twelve minutes on average.) Hence, both the persistence of a TP implemented on such systems and its recoverability would be lost. This observation leads us to formulate another property that we require of the system that implements the trusted path: (4) The properties that are assumed of the trusted path should be formally verifiable. Otherwise, design and implementation errors would leave the TP exposed to attacks by malware and malicious insiders.

Recent TCG proposals [35] that could be used to establish trusted paths can be broadly classified as static root of trust and dynamic root of trust for measurement protocols. Both protocols use a public key cryptosystem to sign and authenticate system software since system boot/re-boot. The processor "measures" the booted code by applying a cryptographic hash function to it and then signs the hash with a hardware-protected private key. A verifying agent can compare the hash to the hash of the expected boot code of which it has a copy, thereby attesting that the booted code was not modified. Upon this base, all trusted software can be attested and thus a user could, in principle, establish and extend the TP to sensitive, high-value applications such as those dealing with financial transactions, cryptographic transactions (e.g., keying and re-keying local and remote systems and applications), command and control applications, and on-line forensic applications even in the presence of malware and malicious insiders.

In the static root of trust for measurement (SRTM) protocol, all system code starting with BIOS, firmware on the adapter cards, bootloader, operating system, and ending with the desired TP application commands is signed and authenticated by the attestation process. Hence, property (4) cannot be achieved as formal verification of millions of lines of source code (comprising the SRTM boot sequence) is beyond the state of the art of current software verification tools. In contrast, the dynamic root of trust for measurement (DRTM) protocol [29, 25] addresses this issue by reducing the trusted base to a manageable size (e.g., the secure loader and selected parts of the BIOS) that could potentially be amenable to formal analysis and verification. However, whether the (1) trusted extensibility, (2) persistence and user-verifiability, and (3) recovery properties of a TP can be achieved by the SRTM and DRTM protocols depends on the strength of the adversary attacks. We first note that, as stated in the TCG specification [35], the Trusted Platform Module (TPM) is not designed to be tamper-proof, i.e. secure against physical attacks. Furthermore, even if the physical tamper-resistance of the Trusted Platform Module (TPM), which stores the private keys used for attestation is assumed, neither the SRTM nor the DRTM protocols can support properties (1)-(3) whenever an insider launches a physical attack against a system—but not against its TPM—left unattended by its owner.

An insider who could access both the Low Pin Count (LPC) bus on a system's motherboard and the BIOS code, which includes the TPM driver, could launch a TPM reset attack [25, 34, 1]. In this attack, the TPM restarts the SRTM boot sequence by loading the hashes of the correct BIOS, adapter-card firmware, bootloader and OS, while the insider-planted, corrupt version of this boot sequence runs. This attack is practical because an insider could obtain the hash values of the correct boot sequence, which the TPM will sign and which would later pass attestation, by passively monitoring the LPC bus [28] and recording the correct hash values of a system identical to that being attacked prior to launching his attack. The correct hash values would be fed to the TPM by insider-modified BIOS during the SRTM boot sequence, as illustrated by recently reported TPM reset attacks [34, 1]. To counter this attack against the SRTM boot sequence, the DRTM protocol uses a new CPU instruction that atomically (i.e., uninterruptably) (1) initializes the CPU to a known trusted state, (2) transfers the code of a secure loader to the TPM via the LPC bus where it is hashed into one of its internal registers, and (3) transfers control to the entry point of the secure loader [2, 24]. The secure loader then measures relevant portions of the BIOS and starts the secure boot sequence. The only effect of a TPM reset attack by an insider would be to restart the secure DRTM boot sequence. However, the DRTM protocol could be subverted by another, equally potent insider attack that would not reset the TPM. Instead, the insider would circumvent the atomicity of the new CPU instruction by injecting signals into the LPC bus pretending to originate from that instruction [34, 1]. This would enable the insider to communicate the hash values of the correct loader to the TPM while his/her modified loader would be run. Thus, an insider-planted boot sequence would initiate the DRTM protocol, pass attestation, and circumvent the properties of trusted path. In principle, regardless of how physically tamper resistant a TPM might be, as long as its LPC bus is exposed to unauthorized outside access, the DRTM protocols can not be secured without relying on built-in secrets that may be vulnerable to new attacks.

More potent, yet non-physical, attacks against the SRTM or DRTM protocols could be launched by insiders and/or malware. These attacks would employ side-channel techniques that would leak the private keys of a tamper-resistant TPM to an adversary. For example, the timing attack of Brumley and Boneh against the private RSA key of Open SSL [5] was recently used in a demonstration attack against the private RSA key of a TPM [34]. In principle, other side-channel attacks, for example based on differential power analysis [27] and fault-injection [4], could be launched against a tamper-resistant TPM to discover its private or secret keys. Not only would such attacks render the trusted path unusable, but more importantly recovery from such attacks by a user (viz., property (3) above) could not be achieved by either the SRTM or the DRTM protocols.

A particularly problematic case of TP recovery arises when the TP design is based on a secret (symmetric) key that is generated by the hardware itself (e.g., using Physically Uncloneable Functions (PUFs) [19]), or stored on an EPROM. In this case, the secret key would become permanently attached to the hardware base and could not be changed. This would violate a fundamental tenet of cryptography that shows that no matter how secure a cipher is, keys must be changed either because their lifetime expires after a certain amount of use or because inevitable attacks in a hostile environment (e.g., side-channel attacks, such as timing and differential power analysis attacks) that could lead to full or partial key discovery must be thwarted. Further, any potential hardware failure, either random or induced by fault-injection attacks, which could compromise key integrity would render the entire system, not just the TP, unrecoverable. We also note that minor variants of this architecture would not improve the situation. For example, if the secret key were stored in programmable registers and would become mutable, access to the key would have to be controlled and updates would have to be performed via some form of TP by a trusted party, if not by the user herself; i.e., the TP could not be bootstrapped without a TP! A similar bootstrapping problem would appear when one would attempt to secure the underlying TPM architecture assumed by the DRTM process by encrypting the communication on the LPC bus between the CPU and TPM: a trusted path would be required to set and reset the secret bus-encryption keys.

Therefore, there is a need for providing trusted paths that satisfy properties (1)-(4) identified above for commercially available systems including those running the Windows and Linux operating systems.

Accordingly, there is a need for establishing a user-verifiable trusted path in the presence of malware and, more particularly, for such methods and apparatuses for use on untrusted computer platforms. Those and other advantages of the present invention will be described in more detail hereinbelow.

BRIEF SUMMARY OF THE INVENTION

The present invention is generally directed to a system for providing trusted paths that satisfy properties (1)-(4) identified above for commercially available systems including those running the Windows and Linux operating systems. In addition, variations of the present invention may include embodiments that encompass existing approaches, in particular, hardware-based approaches to protecting cryptographic keys and identifying the software loaded on a device proposed by the Trusted Computing Group (TCG) [35]. Although it is not required by the present invention, one embodiment of the present invention may, unlike the TCG proposals, use trusted-path establishment protocols that do not use any stored secrets in either hardware or software, thereby eliminating a large attack surface and facilitating user initiated recovery of trusted path after system compromise (i.e., property (3)). Furthermore, the trusted components of our protocols are small, enabling the kind of formal analysis required to satisfy property (4). Below, we outline arguments indicating why the TCG proposals fail to satisfy all four desired properties in the face of insider and malware attacks. These points are based on recent research [28, 25, 34, 1] and an ongoing formal study of the TCG architecture and protocols [18]. We then summarize how our approach avoids these issues and successfully achieves all four properties.

One distinctive feature of the TP design of the present invention (described in detail below) is that it can optionally operate without relying on hardware-protected secrets anywhere in the system. Hence, our design provides both an alternate, fundamentally different approach to TP design and the basis for trusted recovery from secret-key compromise whenever such keys are used. It enables the bootstrapping of application-level, user-verified TP, possibly using hardware-protected secret keys—as suggested by the TCG proposals—that can be changed in a secure, practical manner by the user himself/herself and by a trusted third party. It also enables users to execute off-the-shelf software (e.g., Windows, Linux, and their applications) that are not expected to be either malware-free or operate in environments free of insider attacks.

The present invention can include or be embodied as computer-readable instructions such as software, firmware, hardware, and other embodiments which, when executed by a processor, causes the processor to perform certain actions according to the present invention. In one embodiment, the present invention includes an apparatus including a processor, memory, an input device, and an output device, and the memory includes computer-readable instructions which, when executed, cause the processor to perform the methods described herein.

In summary, the present invention has improved resistance to attacks from the most powerful adversary known to date. The present invention can be used, for example, in sensitive and high-value applications, such as command and control systems, cryptographic transactions, financial transactions, on-line forensic analysis, in the presence of malware and malicious insider attacks.

Many other variations are possible with the present invention, and those and other teachings, variations, and advantages of the present invention will become apparent from the description and figures of the invention.

BRIEF DESCRIPTION OF THE SEVERAL VIEWS OF THE DRAWING

Embodiments of the present invention will now be described, by way of example only, with reference to the accompanying drawings for the purpose of illustrating the embodiments, and not for purposes of limiting the invention.

FIG. 4 illustrates one embodiment of how the processor interacts with the verification device.

FIG. 19 illustrates one embodiment of Trusted Verifier attestation protocol according to the present invention.

FIG. 22 illustrates one embodiment of the verifiable code execution protocol according to the present invention. The numbering of events is the same as in FIG. 21. V is the verifier, P the verification function, and E is the target executable.

DETAILED DESCRIPTION OF THE INVENTION

Figure 1:
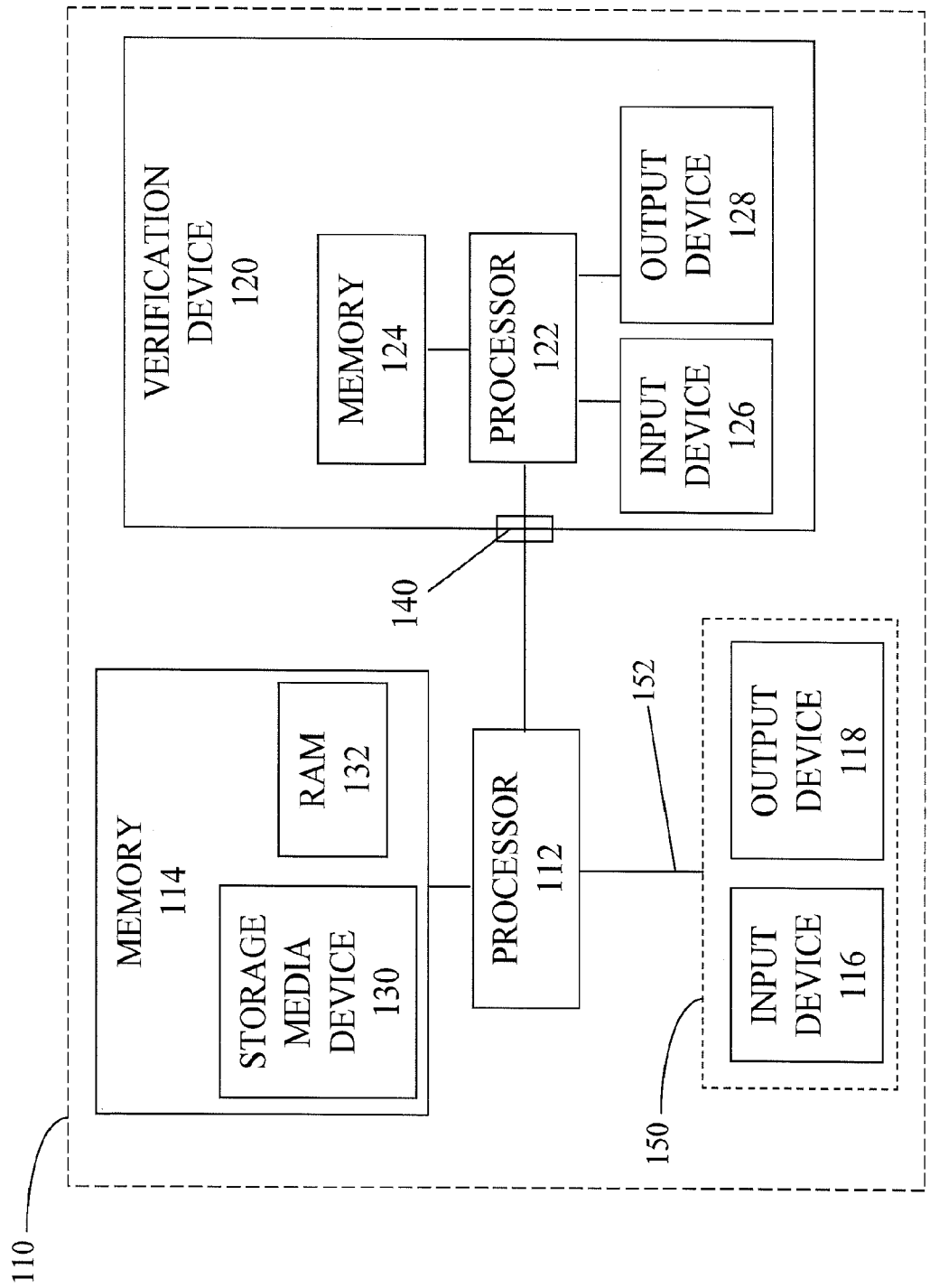
FIG. 1 illustrates one embodiment of a computer according to the present invention.

FIG. 1 illustrates one embodiment of a computer 110 according to the present invention. In that embodiment, the computer 110 includes a processor 112, memory 114, an input device 116, an output or display device 118, and a verification device 120. The processor 112 is connected to the memory 114, the input device 116, and the output device 118. The memory 114 includes computer readable instructions, such as computer hardware, software, firmware, or other forms of computer-readable instructions which, when executed by the processor 112, cause the processor 112 to perform certain functions, as described herein. The computer 110 may also include one or more other devices not shown herein. Although this embodiment is illustrated with the verification device 120 as part of the computer 110, the verification device 120 may be separate from the computer 110.

The processor 112 receives input from the input device 116, provides signals to control the output device 118, and provides and receives other signals such as, for example, signals to and from the verification device 120. The processor 112 also performs certain functions, as described herein.

The memory 114 can be any form of computer-readable memory, and may store information in magnetic form, optical form, electrical form, or other forms. The memory 114 includes computer-readable instructions which, when executed by the processor 112, cause the processor 112 to perform certain functions, as described herein.

The memory 114 may have many variations. For example, the memory 114 may be separate from the processor 112 or the memory 114 may be integrated with the processor 112. The memory 114 may also include one memory device or the memory 114 may include more than one memory device. For example, the memory 114 may include one or more memory devices of non-volatile memory and it may also include one or more memory devices of volatile memory. For example, the memory 114 may include a storage media device 130 for long term data storage, such as a magnetic disk drive, an optical drive, or flash memory. The memory 114 may also include RAM 132 or other memory devices for other functions. Other combinations and variations of memory 114 may also be used with the present invention.

The input device 116 may be a keyboard, a touchscreen, a computer mouse, or other forms of inputting information from a user. The input device 116 may also be used for inputting information from a source other than a human user, such as a data port for receiving input from another computer.

The output device 118 may be a video display or other forms of outputting information to a user. The output device 118 may also be video device, audio device, a printer, or other devices such as, for example, lights, speakers, or other forms of output that can be used to convey information to, or to get the attention of, a user. The output device 118 may also be used for outputting information to something other than a human user, such as a data port.

The input 116 and output 118 devices will sometimes be referred to as a user interface 150. The user interface 150 may include both the input 116 and output 118 devices, or the user interface 150 may contain only one of the input 116 and output 118 devices. The present invention may also include one or more trusted channels 152. In some embodiments the trusted channel 152 exists between the user interface 150 and the processor 112. In other embodiments, the trusted channel 152 may extend between the processor and the user interface 150, passing through other system components that interconnect the processor 112 and the user interface 150. Such components may include busses, interconnects, memory controller hubs, input-output controller hubs, and other components. In some embodiments, these other components may be critical to the trustworthiness of the channel. In other embodiments, the behavior of these components may not affect the channel. Other configurations are also possible.

The verification device 120 includes a processor 122 and memory 124. The verification device 120 may also include an input device 126 and an output device 128. In some embodiments, the verification device 120 will be relatively small for reasons described herein. For example, keeping the verification device 120 small and simple can offer advantages for the security offered by the device 120. Also, if the verification device 120 is removable from the computer 110 and meant to be portable with a user, then a relatively small size is advantageous. However, a small size is not required and it is possible for the verification device 120 to be larger and to include other features and functions, particularly if the verification device 120 is integrated into the computer or if the verification device 120 is not meant to be portable with the user. In the case of a removable verification device 120, it may also include a communications interface 140 so that the verification device 120 is not permanently attached to the computer 110. The interface 140 may be, for example, a USB port, an infrared transmitter/receiver or other communications interfaces that allow the verification device 120 to be connected and disconnected by the user. In those embodiments, the computer 110 will also have a communications interface 140 that is complimentary to the communications interface 140 of the verification device 120.

The verification device 120 may be integrated with the other parts of the computer 110, or the verification device 120 may be removable and portable by a user. In one embodiment, the verification device 120 plugs into a port of the computer, such as a USB port or any other port that may be part of a computer and accessible by a user.

The verification device 120 includes information or policies about other parts of the computer 110. For example, the verification device 120 may include policies about the secure executable 312 (see FIG. 3) and the hypervisor 316 (see FIG. 3), as well as other information. The verification device may include a policy for each executable, or it may include policies that are shared by more than one executable. For example, the policies may include known good identity measurements for the select executable 312, the hypervisor 316, and other parts of the computer 110. Identity measurements for an executable may be cryptographic hashes computed over those executables, or they may include digital signatures, or they may take other forms.

The policies may also include a list of trusted endpoints on a network 210 (see FIG. 2) for executables that have a network interface or which otherwise have access to a network 210. The verification device 120 may, for example, include a single list of trusted endpoints on the network 210, or it may include a list of trusted endpoints for each executable, or it may include multiple lists of trusted endpoints, some of which are unique to a particular executable and some of which are shared by more than one executable. Each policy may apply to a different executable or some policies may be shared by more than one executable.

The policies may also identify other executables with which a particular executable may share information or otherwise communicate. For example, there may be a policy for a select executable 312 identifying the other executables with which the select executable 312 may share information.

The verification device 120 may or may not permit policies or other information to be added, deleted, or modified. For example, in one embodiment the verification device 120 allows updates to be made to trusted endpoints on a network 210. In another embodiment, the verification device 120 is read-only in order to reduce the risk of the verification device 120 being compromised.

The verification device 120 is connected to the processor 112. This does not necessarily mean that the verification device 120 is integrated with or physically attached to the processor 112, but rather that there is a direct or indirect communication link between the verification device 120 and the processor 112 in order to perform the methods described herein.

The processor 122 in the verification device 120 performs certain functions, as described herein. The processor 122 in the verification device 120 is connected to and communicates with the processor 112.

The memory 124 in the verification device can be any form of computer-readable memory, and may store information in magnetic form, optical form, electrical form, or other forms. The memory 124 may have many variations, such as those described above with regard to memory 114. For example, the memory 124 in the verification device may be separate from the processor 122 in the verification device, or the memory 124 in the verification device may be integrated with the processor 122 in the verification device. The memory 124 in the verification device may also include more than one memory device, which may be integrated with the processor 122 in the verification device, separate from the processor 122 in the verification device, or both. Other variations are also possible.

The memory 124 includes computer readable instructions which, when executed by the processor 122 in the verification device, cause the processor 122 in the verification device to perform certain functions, as described herein.

The input device 126 and the output device 128 may be the same or different than the input 116 and output 118 devices of the computer 110. For example, the verification device 120 may be a relatively small device and, as a result, the input 126 and output 128 devices may be correspondingly small and simplified. For example, rather than a keyboard or a computer mouse, the input device 126 may include one or more buttons or switches for input from a user, such as an analog switch or a multi-position knob. Similarly, rather than a full video display, the output device 128 may include one or more lights, buzzer or other device to provide feedback to the user. Alternatively, the verification device 120 may also have larger and/or more complex input 126 and output 128 devices. In one embodiment, the verification device 120 may include "soft keys" and an electronic display, such as may be used with a PDA or smart phone. In other embodiments, the verification device 120 may include a combination of soft keys and physical buttons or switches. Other variations are also possible.

Many variations are possible with the computer 110 according to the present invention. For example, more than one processor 112, memory 114, input device 116, output device 118, and verification device 120 (as well more than one of each component in the verification device 120), may be present in or with the computer 110. In addition, devices not shown in FIG. 1 may also be included in the computer 110, and devices shown in FIG. 1 may be combined or integrated together into a single device, or in some cases omitted. Similar variations and modifications are also possible with other embodiments described and illustrated herein.

The present invention may be embodied in many forms. For example, the present invention may be an embedded system such as software on a chip. In another embodiment, the present invention may be embodied as one or more devices located in one or more parts of the invention illustrated in FIG. 1. For example, the present invention may be embodied as computer-readable instructions (e.g., software on a chip, software in a portable or integrated memory device, hard-wired instructions embodied in a hardware device, or other variations). In another embodiment, the present invention may be embodied as one or more discrete computers. The present invention may also be embodied as computer-readable instructions (e.g., computer software, firmware, or hardware). The computer-readable instructions may be stored in memory devices which may be integrated or embedded into another device, or which may be removable and portable. Other variations and embodiments are also possible.

Figure 2:
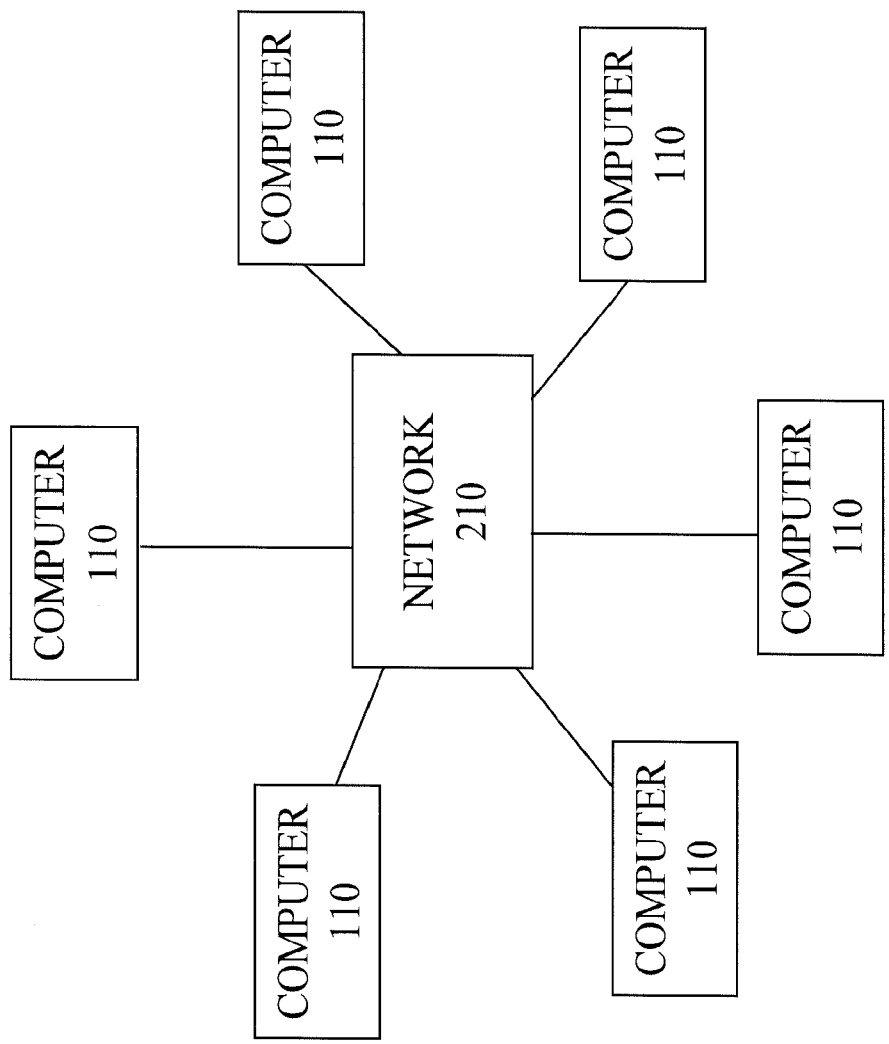
FIG. 2 illustrates another embodiment of the present invention in which several computers are connected together via a network.

FIG. 2 illustrates another embodiment of the present invention in which several computers 110 are connected together via a network 210. The network 210 provides a connection between the several computers 110. The computers 110 may be referred to as "endpoints" on the network 210. In other words, from the perspective of one of the computers 110 on the network 210, the other computers 110 are endpoints on the network 210 with which a network connection can be made.

The network 210 may be, for example, the Internet, a local area network, a wide area network, a metro area network, or other types of networks. The network 210 may be a wired network (such as an electrical network or an optical network), a wireless network, or a combination of different kinds of networks.

As described above, the present invention may be embodied as software, hardware, firmware, or in other forms. The present invention may, for example, be embodied in some or in all of the computers 110 in the network 210. For example, only one computer 110 may include a verification device 120, while the other computers 110 on the network 210 may operate without verification devices 120. In other embodiments, several or all of the computers 110 may include verification devices 120. In other embodiments, the network 210 itself may include one or more parts embodying the present invention, including verification devices 120.

Figure 3:
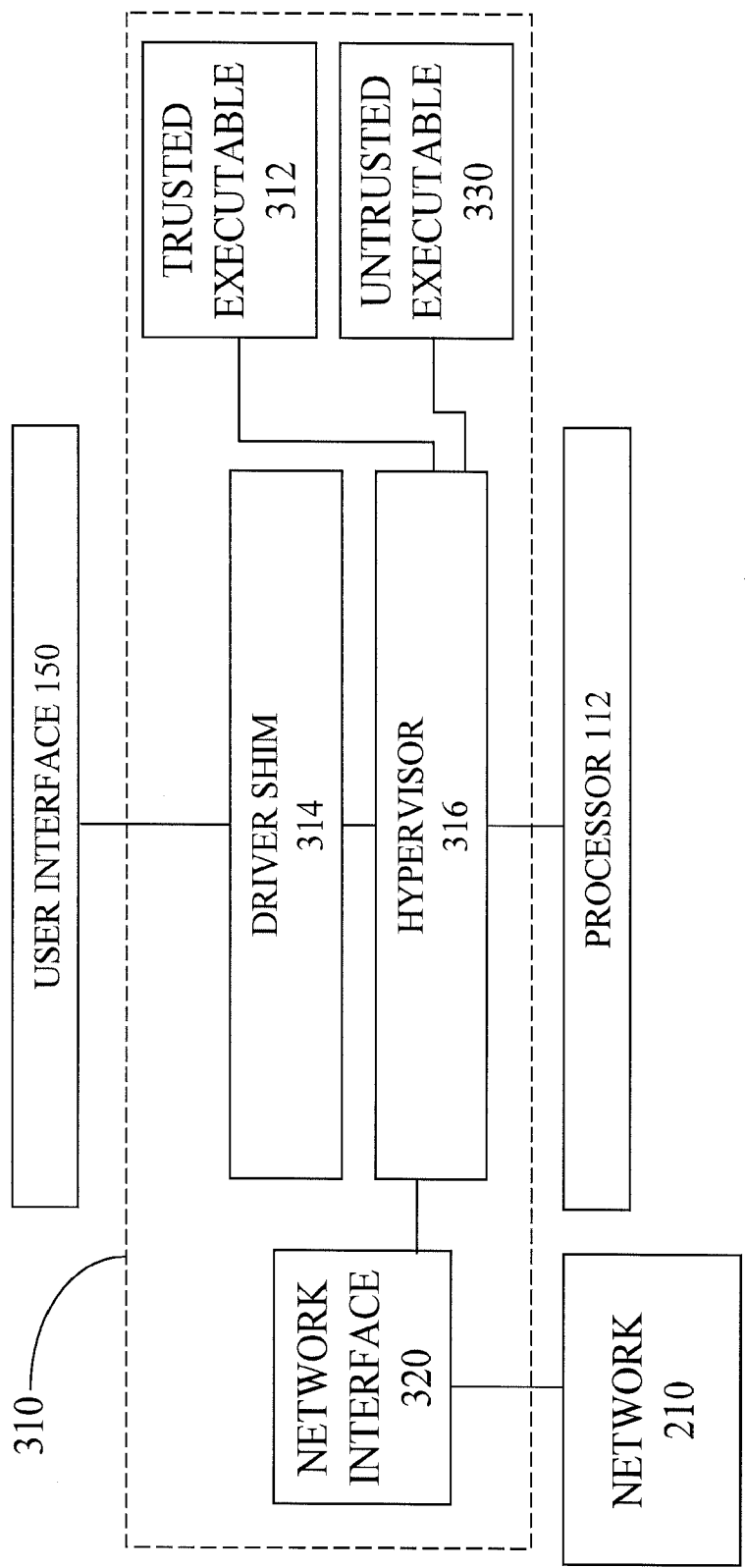
FIG. 3 illustrates one embodiment of a computing platform that may be created and used with the present invention.

FIG. 3 illustrates one embodiment of a computing platform 310 that may be created and used with the present invention. The computing platform 310 may be created, for example, when the computer-readable instructions in the memory 114 of the computer 110, when executed by the processor 112, cause the processor 112 to create the computing platform 310.

In the illustrated embodiment, the computing platform 310 includes a trusted executable, a driver shim 314, and a hypervisor 316. The computing platform 310 may also include one or more network interfaces 320 and one or more untrusted executables 330. The user interface 150, the trusted executable 312, the driver shim 314, the hypervisor 316, and the untrusted executable 330 may each have one or more characteristics, such as a privilege level, an identity, and other characteristics.

The trusted executable 312 is an executable that is assumed uncorrupted and safe to execute. The trusted executable 312 may be, for example, an application which is used for secure financial transactions, or for exchanging personal and sensitive information with a healthcare provider, or information or some other application that is trusted by the user.

The untrusted executable 330, in contrast, is an executable which is not trusted or assumed to be secure or free from undesirable conditions such as infection by malware.

The hypervisor 316 has access to both the trusted executable 312 and the untrusted executable 330 and controls information and access available to trusted executable 312 and the untrusted executable 330. The hypervisor 316 can also perform other tasks such as, for example, partitioning memory 114. In one embodiment, the hypervisor 316 partitions a unique portion of the memory 114 for the exclusive use of the trusted executable 312, partitions a unique portion of the memory 114 for the exclusive use of the untrusted executable 330, and partitions a unique portion of the memory 114 for the exclusive use of the hypervisor 316. Many other embodiments are also possible, such as partitioning memory 114 for more than one trusted executable 312, more than one untrusted executable 330, and more than one hypervisor 316. The unique portions of memory 114 may be different parts of the same memory device or it may be parts of different memory devices, or combinations thereof. Furthermore, the hypervisor 316 may also partition memory for shared use by those devices, and the hypervisor 316 may partition memory for exclusive or shared use by other parts of the computer 110.

The network interface 320 provides a connection to the network 210. In some embodiments, the physical network interface 320 may be located in the verification device 120. This is advantageous because it allows the hypervisor 316 to control access to the network interface 320. In other embodiments, the network interface 320 may be located outside of the verification device 120, such as in another part of the computer. As in the case of the network interface 320 being located in the verification device 120, this embodiment may also allow the hypervisor 316 to control access to the network interface 320.

The computing platform 310 may take many forms. For example, the computing platform 310 may include one or more trusted executables 312, one or more untrusted executables 330, one or more drive shims 314, and one or more hypervisors 316. Furthermore, the computing platform 310 may include other features not illustrated herein.

FIG. 4 illustrates one embodiment of how the processor 112 interacts with the verification device 120 to establish a trusted path according to one embodiment of the present invention. In the illustrated embodiment, the process represents a situation in which there is first a request to execute the trusted executable 312. This process of establishing a trusted path may include the steps of authenticating a secure connection.

Figure 5A:
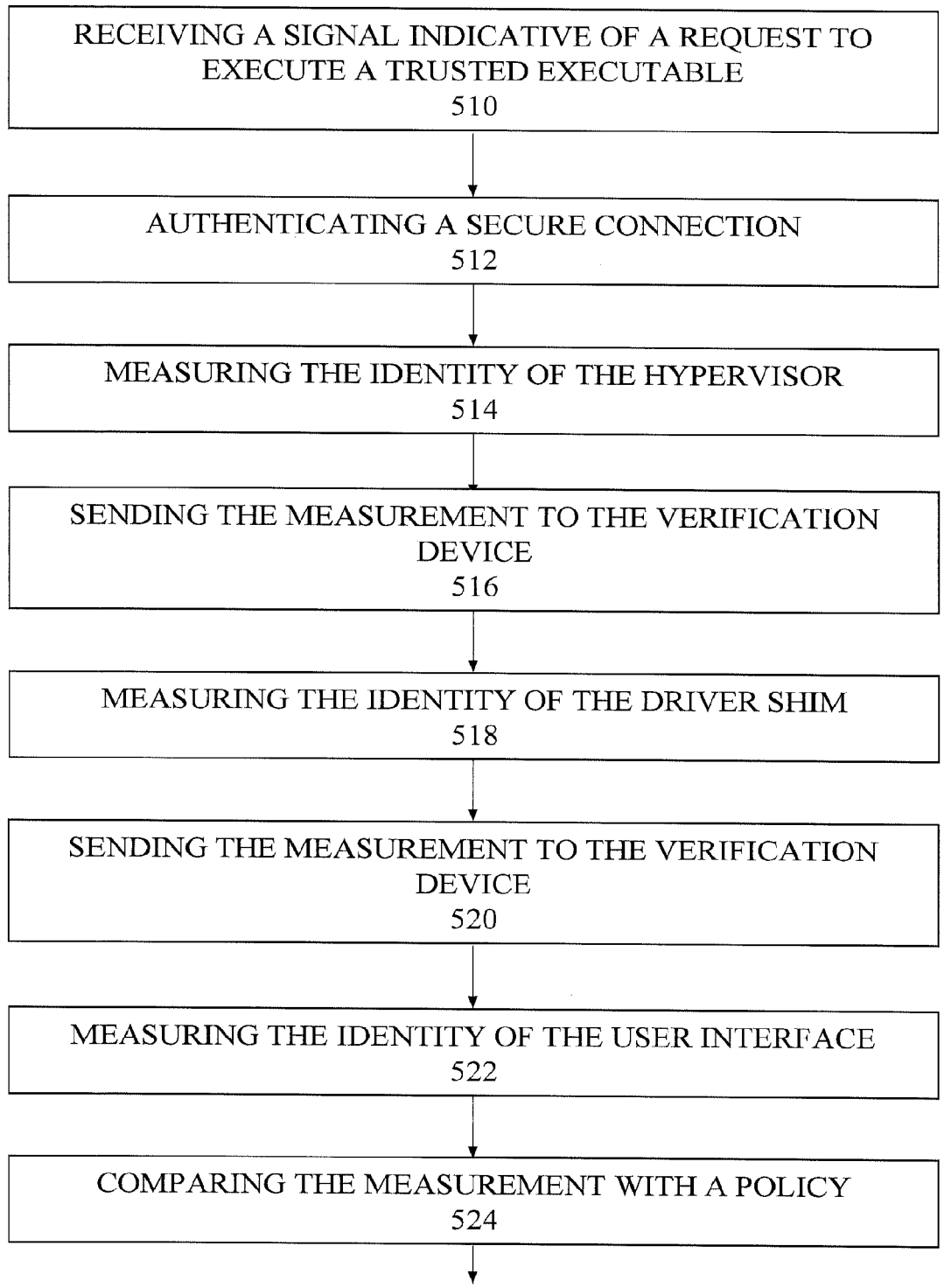
FIGS. 5A and 5B illustrate one embodiment of a process according to the present invention that is performed by the processor in the computer.

FIG. 5A illustrates one embodiment of a process according to the present invention that is performed by the processor 112 after the processor 112 receives a signal indicating a request to execute the trusted executable 312. A request to execute the trusted executable 312 may be received immediately after creating the computing platform 310, or the request may be received at a later time after the processor 112 has perform other tasks, such as executing one or more untrusted executables 330. After receiving the request, the processor 112 sends certain information related to the trusted executable 312 to the verification device 120.

Figure 6:
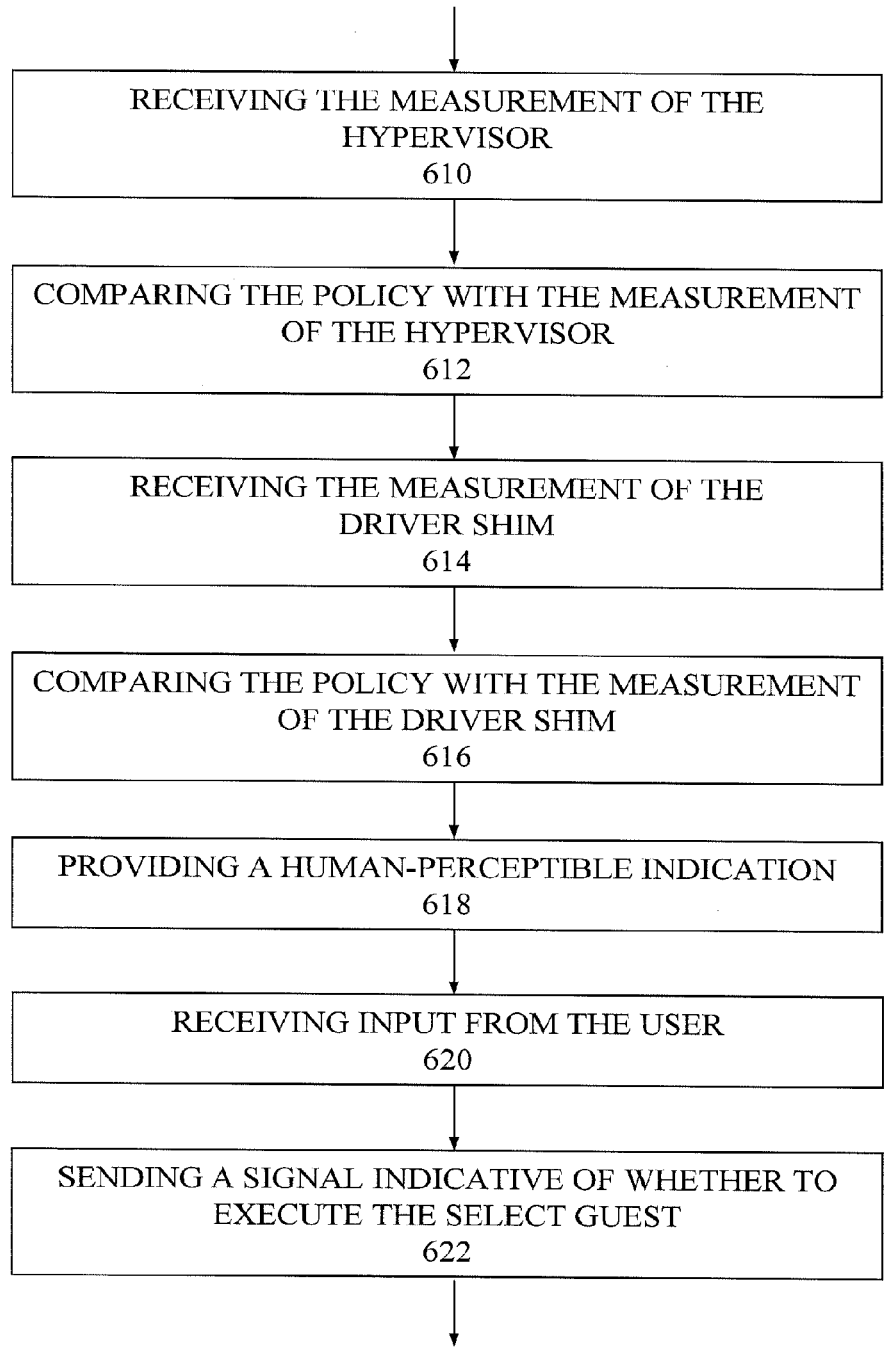
FIG. 6 illustrates one embodiment of a process according to the present invention that is performed by the verification device after receiving information related to the select executable from the processor.

FIG. 6 illustrates one embodiment of a process according to the present invention that is performed by the verification device 120 after receiving information related to the trusted executable 312 from the processor 112. The verification device 120 determines whether the trusted executable 312 should be executed and sends a signal back to the processor 112.

Figure 5B:
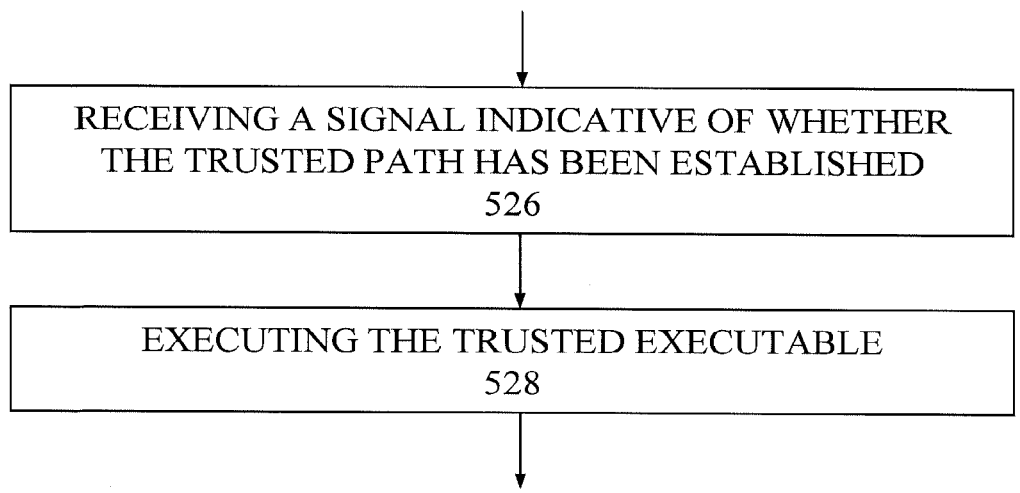

FIG. 5B illustrates one embodiment of a process according to the present invention that is performed by the processor 112 after receiving the signal from the verification device 120.

Each of FIGS. 5A, 5B, and 6 will now be described in more detail.

FIGS. 5A and 5B illustrate one embodiment of another method performed by the processor 112. The method may be performed after the computing platform 310 is created and when a user wants to execute the trusted executable 312. The method may be performed, for example, when the computer-readable instructions in the memory 114 of the processor 112, when executed by the processor 112, cause the processor 112 to perform the following steps.

Step 510 includes receiving a signal indicative of a request to execute the trusted executable 312. The signal may be initiated by a human user, or it may be initiated by some other part of the computer 110 or by another computer.

Step 512 includes authenticating a secure connection between the hypervisor 316 and the verification device 120. This step is performed after receiving the signal indicative of the request to execute the select executable 312.

Step 514 includes measuring the identity of at least a portion of the hypervisor 316. This step may measure the identity of the entire hypervisor 316 or it may measure the identity of less than all of the hypervisor 316. This measurement may be made when the hypervisor 316 is in a known state. This measurement of the hypervisor 316 can be used to determine if the hypervisor 316 is in a proper state or if it has been modified or otherwise compromised. For example, if malware has infected the hypervisor 316, the measurement of the identity of the hypervisor 316 will be different than the measurement of the uninfected hypervisor 316.

Step 516 includes sending the measurement of the identity of the hypervisor 316 to the verification device 120 wherein it will be compared with a policy stored in the verification device 120. Alternatively, this comparison can be performed by the processor 112, although the verification device 120 may be more secure than the processor 112 and, therefore, the use of the verification device 120 may be preferred.

Step 518 includes measuring the identity of at least a portion of the driver shim 314.

Step 520 includes sending the measurement of the identity of the driver shim to the verification device 120 wherein it will be compared with a policy stored in the verification device 120. Alternatively, this comparison can be performed by the processor 112, although the verification device 120 may be more secure than the processor 112 and, therefore, the use of the verification device 120 may be preferred.

Step 522 includes measuring the identity of at least a portion of the user interface 150.

Step 524 includes comparing the measurement of the identity of the user interface 150 with a policy for the user interface 150. This step may be performed by the processor 112 or it may be performed in the verification device 120.

The steps performed by the verification device 120 after receiving the measurements are described below with reference to FIG. 6.

Step 526 includes receiving a signal from the verification device 120 indicative of whether the trusted path 152 has been established. If the trusted path 152 has been established, the process proceeds to step 520. If the trusted path has not been established, the process does not proceed to step 520.

Step 528 includes executing the trusted executable if the signal from the verification device 120 indicates that the trusted path has been established. This step 528 may also require additional conditions to be satisfied before executing the trusted executable 312.

If, however, the signal from the verification device 120 indicates that the trusted executable 312 should not be executed, then step 528 may not be executed. For example, the computer 110 may include a default in which the trusted executable 312 is never executed in these circumstances. Alternatively, the computer 110 may include an override such as, for example, if the user provides additional input to execute the trusted executable 312 (even after the user receives a signal indicating that the measurement of the trusted executable 312 received by the verification device 120 does not corresponds with the policy stored in the verification device 120). This input from the user may be provided, for example, through an input on the verification device 120 as described below with regard to FIG. 6.

Steps 512-524 are performed after step 510, receiving the signal indicative of the request to execute the trusted executable 312. Recent measurements are desirable in order to avoid a situation in which the select executable 312 is compromised after measurement and before execution. These steps are also performed without rebooting the computer 110. This is important because rebooting the computer 110 is time consuming and it is desirable to reduce the time that the user is required to wait. However, the present invention can be used in different embodiments, such as where the computer 110 is rebooted.

FIG. 6 illustrates one embodiment of a method performed by the processor 122 of the verification device 120. The method may be performed after steps 514 and 518 of FIG. 5A to verify that the select executable 312 is still secure and not compromised. The method may be performed, for example, when the computer-readable instructions in the memory 124 of the verification device 120, when executed by the processor 122 in the verification device 120, cause the processor 122 in the verification device 120 to perform the following steps.

Step 610 includes receiving the measurement of the hypervisor 316 from the processor 112 in the computer 110. The measurement and the sending of the measurement are described above in FIG. 5A.

Step 612 includes comparing the policy stored in the verification device 120 with the measurement of the hypervisor 316 received by the verification device 120. This step compares the measured value of the hypervisor 316 with the known value stored as a policy in the verification device 120 and determines whether the measurement of the hypervisor 316 received by the verification device 120 corresponds with the policy stored in the verification device 120.

Steps 614 and 616 are analogous to steps 610 and 612 except that they apply to the driver shim 314.

Step 618 includes providing a human-perceptible indication of whether the measurements of the hypervisor 316 and the driver shim 314 received by the verification device 120 corresponds with the corresponding policies stored in the verification device 120. In other embodiments this step may be or may also include providing a human-perceptible indication the status of each of the hypervisor 316 and the driver shim 314.

Step 620 includes receiving an input from a user indicative of confirmation to execute the trusted executable 312. The human confirmation in this step may be confirmation to execute the trusted executable 312 after it is determined that the measurements of the hypervisor 316 and the driver shim 314 received by the verification device 120 corresponds with the policies stored in the verification device 120. Alternatively, the human confirmation in this step may be confirmation to override a situation in which the measurements of the hypervisor 316 and the driver shim 314 received by the verification device 120 does not corresponds with the policies stored in the verification device 120, but in which the user still wants to execute the trusted executable 312 despite the potential problems. This step may also be omitted in some embodiments. For example, the present invention may not require input from the user in certain situations, such as when the policy stored in the verification device 120 corresponds with the measurements of the identity of the hypervisor 316 and the driver shim 314 that was received by the verification device 120. In another embodiment, the present invention may provide a warning but not require user input before executing the trusted executable 312, even if the hypervisor 316 and the driver shim 314 appear to be compromised.

Step 622 includes sending a signal to the processor 112 indicative of whether to execute the trusted executable 312. The signal to execute the trusted executable 312 may be based on whether the measurements of the hypervisor 316 and the driver shim 314 received by the verification device 120 corresponds with the policies stored in the verification device 120. Alternatively, the signal to execute the trusted executable 312 may be based on the confirmation from the user in step 620.

Steps 512, 514, 516, 518, 520, 522, 524, 610, 612, 614, and 616 are performed after step 510, receiving the signal indicative of the request to execute the trusted executable 312. A recent measurement of the trusted executable 312 is desirable in order to avoid a situation in which the trusted executable 312 is compromised after measurement and before execution (a time-of-check, time-of-use vulnerability). These steps are also performed without rebooting the computer 110. This is important because rebooting the computer 110 is time consuming and it is desirable to reduce the time that the user is required to wait. However, the present invention can be used in different embodiments, such as where the computer 110 is rebooted.

The order of the steps do not need to be exactly as illustrated herein. For example, although steps 610 and 612 are illustrated as being performed before steps 614 and 616, in other embodiments steps 610 and 612 may be performed after steps 614 and 616. Other variations are also possible with the process described in FIGS. 5 and 6.

Figure 7:
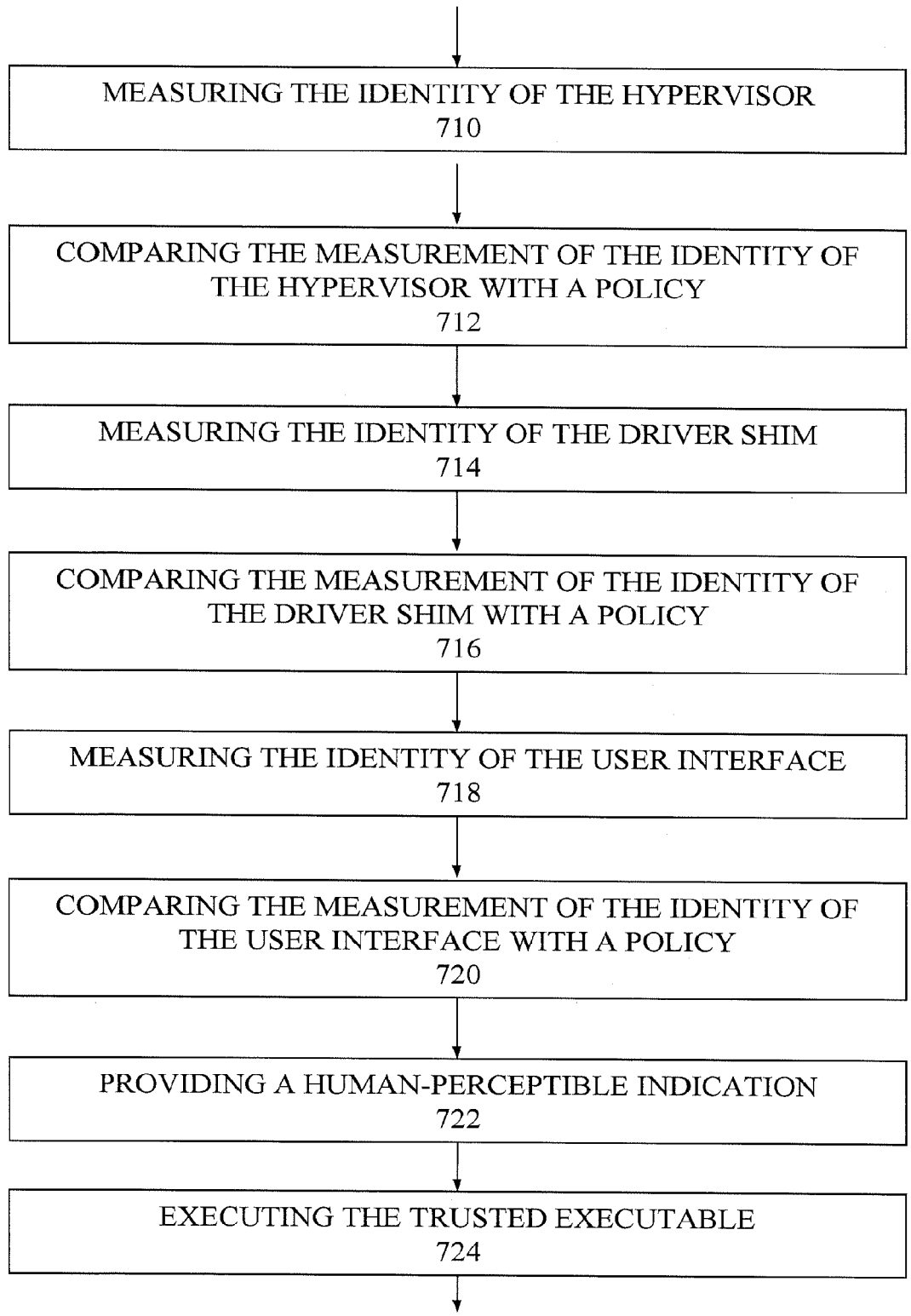
FIGS. 7-16 illustrate embodiments of methods performed by the present invention.

FIG. 7 illustrates one embodiment of a method of the present invention for establishing a trusted path 152 between a user interface 150 and a trusted executable 312, wherein the trusted path 152 includes a hypervisor 316 and a driver shim 314.

Step 710 includes measuring the identity of the hypervisor 316. This step may include attesting the measurement of the identity of the hypervisor 316. Furthermore, attesting the measurement of the identity of the hypervisor 316 may include software-based attestation.

Step 712 includes comparing the measurement of the identity of the hypervisor 316 with a policy for the hypervisor.

Step 714 includes measuring an identity of the driver shim 314. This step may include attesting the measurement of the identity of the driver shim 314. Furthermore, attesting the measurement of the identity of the driver shim 314 may include software-based attestation.

Step 716 includes comparing the measurement of the identity of the driver shim 314 with a policy for the driver shim 314.

Step 718 includes measuring an identity of the user interface 150. This step may include attesting the measurement of the identity of the user interface 150. Furthermore, attesting the measurement of the identity of the user interface 150 may include software-based attestation.

Step 720 includes comparing the measurement of the identity of the user interface 150 with a policy for the user interface.

Step 722 includes providing a human-perceptible indication of whether the identity of the hypervisor 316, the identity of the driver shim 314, and the identity of the user interface 150 correspond with the policy for the hypervisor 316, the policy for the driver shim 314, and the policy for the user interface 150, respectively.

Step 722 may include providing a single human-perceptible indication, or it may include providing two or more human-perceptible indications. In one embodiment, step 722 includes: providing a first human-perceptible indication when all of the identity of the hypervisor 316, the identity of the driver shim 314, and the identity of the user interface 150 correspond with the policy for the hypervisor 316, the policy for the driver shim 314, and the policy for the user interface 150, respectively; and providing a second human-perceptible indication when at least one of the identity of the hypervisor 316, the identity of the driver shim 314, and the identity of the user interface 150 does not correspond with the policy for the hypervisor 316, the policy for the driver shim 314, and the policy for the user interface 150, respectively; and wherein the first human-perceptible indication is different than the second human-perceptible indication.

Step 724 includes executing the trusted executable 312.

Many other variations are also possible with the present invention. For example, in one embodiment the policy for the hypervisor 316 and the policy for the driver shim 314 is stored in a component that is not part of the trusted path 152 between the user interface 150 and the trusted executable 312.

In another embodiment, the hypervisor 316 and the driver shim 314 are implemented in a computer 110, and the policy for the hypervisor 316 and the policy for the driver shim 314 are stored in a device separate from the computer 110 in which the hypervisor 316 and the driver shim 314 are implemented.

In another embodiment, the policy for the user interface 150 is stored in the driver shim 314.

Figure 8:
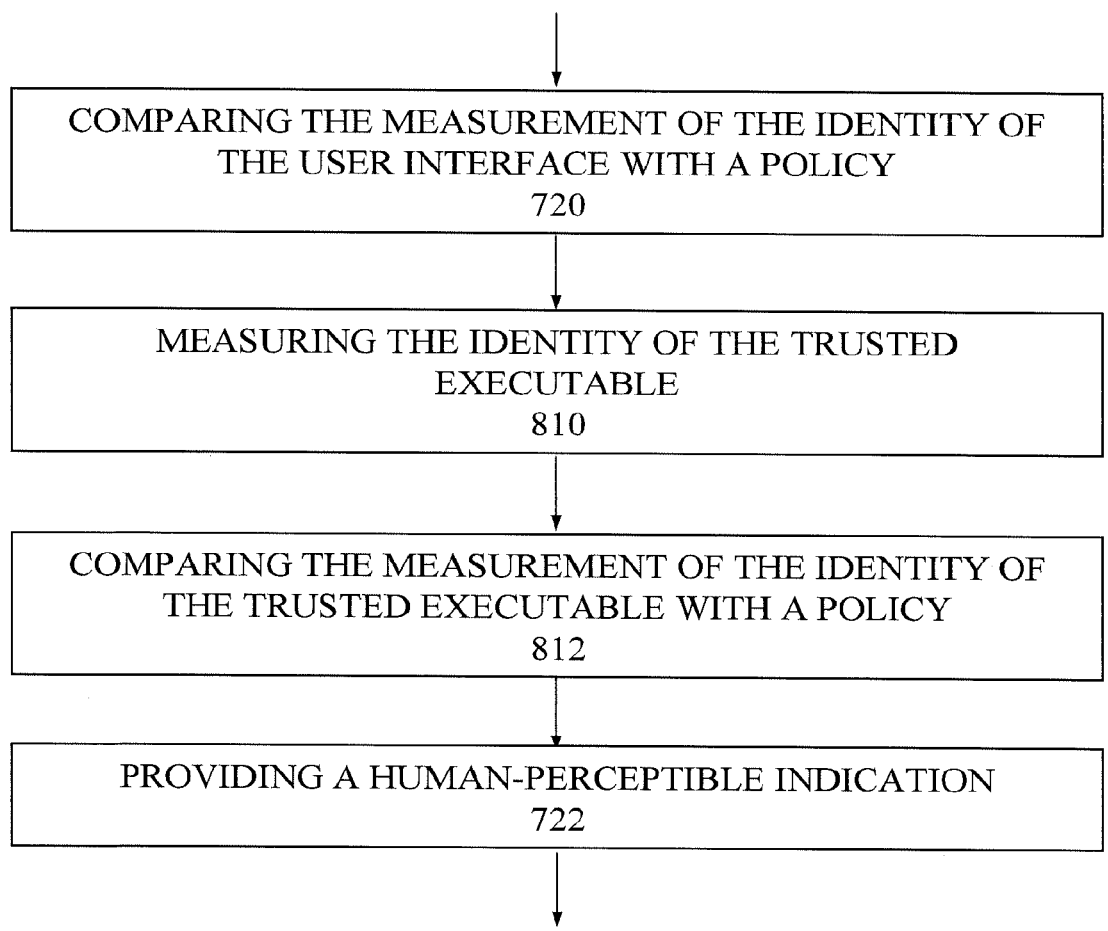

FIG. 8 illustrates another embodiment of the invention in which additional steps are performed between steps 720 and 722 of FIG. 7.

Step 810 includes measuring an identity of the trusted executable 312. Variations are possible with this step.

Step 812 includes comparing the measurement of the identity of the trusted executable 312 with a policy for the trusted executable 312.

Variations are possible with the present invention. In particular, the order in which the methods are performed can be modified. For example, as mentioned above, step 714 (measuring the identity of the driver shim) and step 716 (comparing the measurement of the identity of the driver shim) may be performed after step 710 (measuring the identity of the hypervisor) and after step 712 (comparing the measurement of the identity of the hypervisor). Also, with reference to FIG. 8, step 810 (measuring the identity of the trusted executable) and step 812 (comparing the measurement of the identity of the trusted executable) may be performed after step 714 (measuring the identity of the driver shim) and after step 716 (comparing the measurement of the identity of the driver shim). Other variations are also possible.

Figure 9:
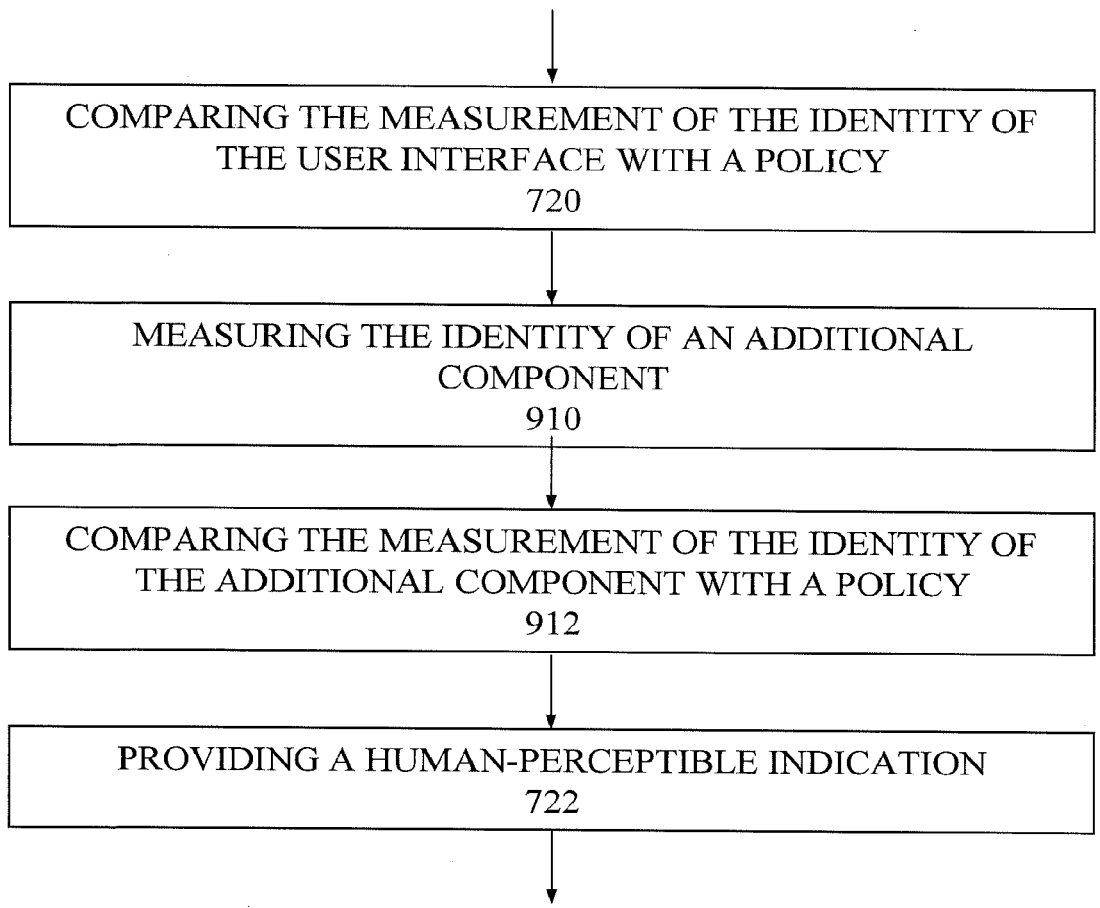

FIG. 9 illustrates another embodiment of the invention in which additional steps are performed between steps 720 and 722 of FIG. 7.

Step 910 includes measuring an identity of an additional component in the trusted path 152 between the user interface 150 and the hypervisor 316. The additional component between the user interface 150 and the hypervisor 316 may be, for example, a memory controller hub, an input/output controller hub, graphics controller, USB controller, dedicated keyboard controller, or the bus involved between the user interface 150 and the hypervisor 316 (e.g., a PCIe bus).

Step 912 includes comparing the measurement of the identity of the additional component in the trusted path 152 between the user interface 150 and the hypervisor 316 with a policy for the component. The policy for the additional component may be stored, for example, in a component that is not part of the trusted path 152 between the user interface 150 and the trusted executable 312. For example, the additional component may be implemented in a computer 110 and the policy for the additional component may be stored in a device separate from the computer 110 in which the additional component is implemented Other variations and modification are also possible.

Figure 10:
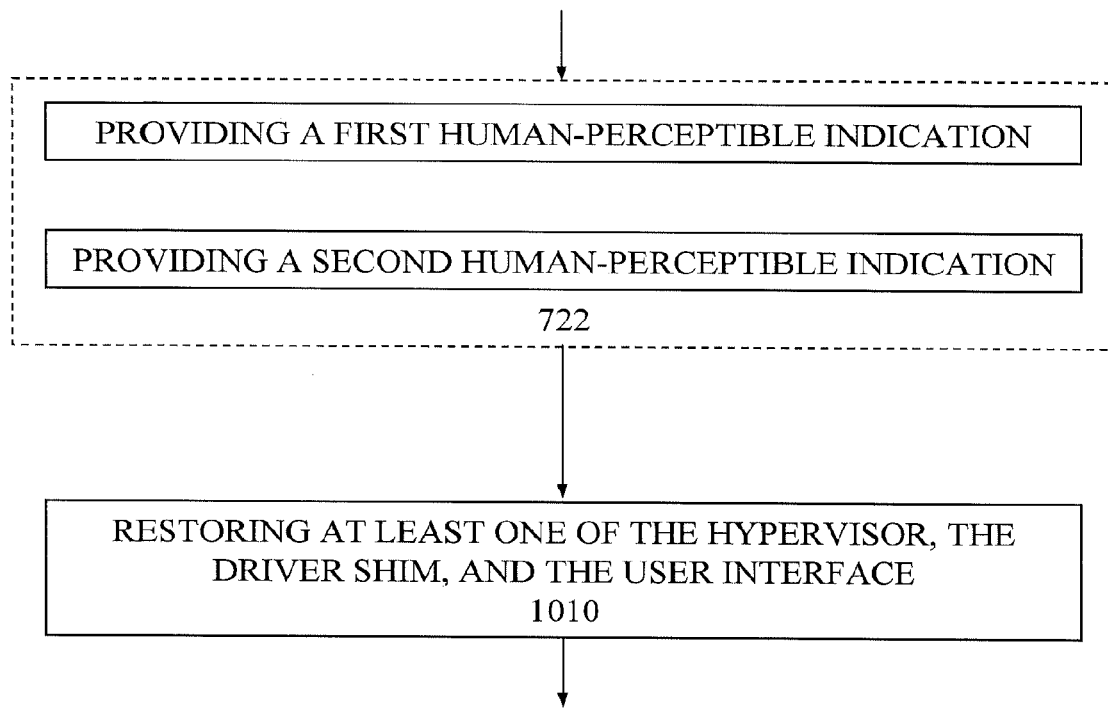

FIG. 10 illustrates another embodiment of the present invention in which step 722 includes providing both a first and a second human-perceptible indication. In this embodiment, step 1010 is performed after providing the second human-perceptible indication and when at least one of the identity of the hypervisor, the identity of the driver shim, and the identity of the user interface does not correspond with the policy for the hypervisor, the policy for the driver shim, and the policy for the user interface, respectively.

Step 1010 includes restoring at least one of the hypervisor 316, the driver shim 314, and the user interface 150 to a known-good state.

Figure 11:
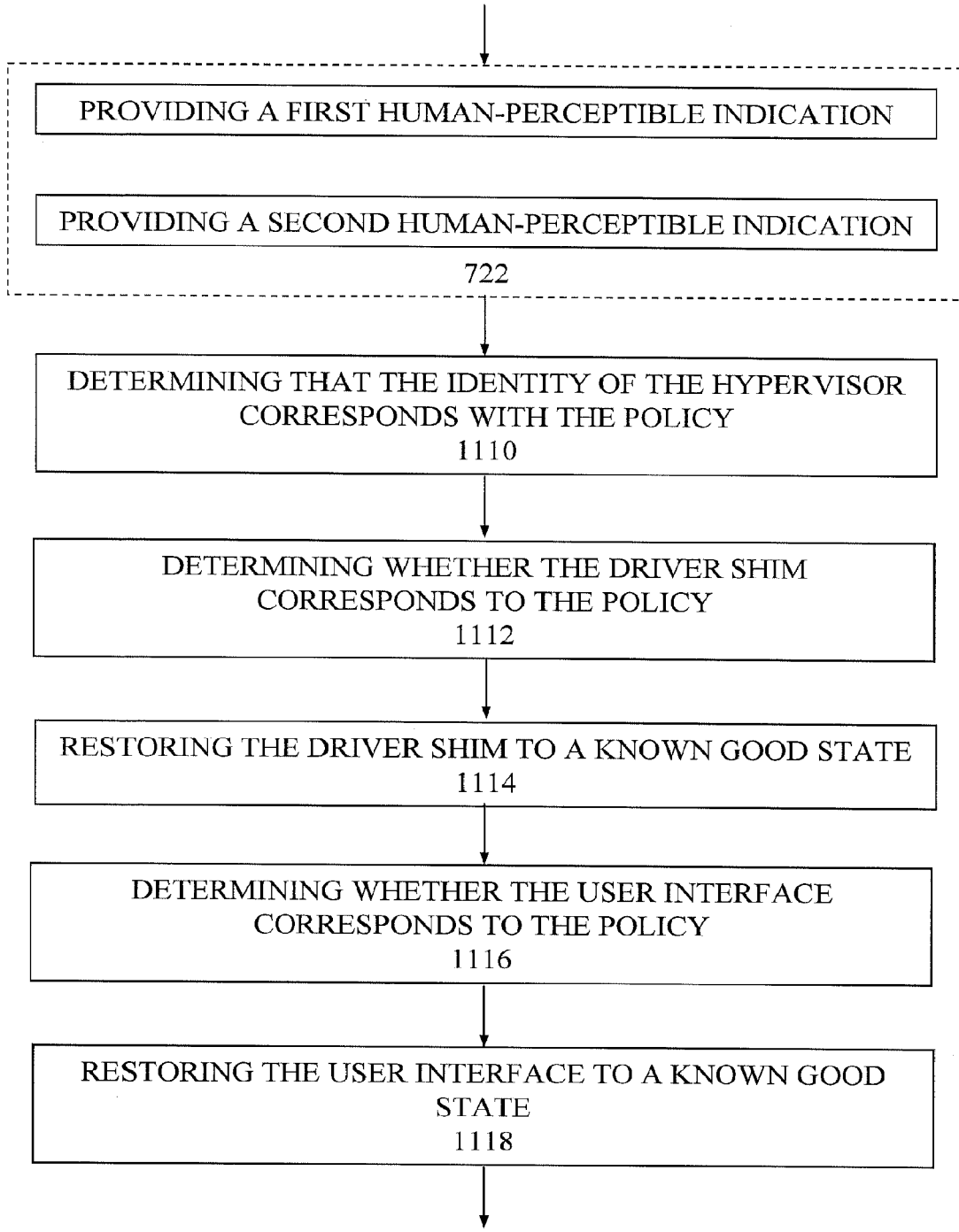

FIG. 11 illustrates another embodiment of the present invention in which additional steps are performed after step 722.

Step 1110 includes determining that the identity of the hypervisor 316 corresponds with the policy for the hypervisor 316.

Step 1112 includes determining whether the identity of the driver shim 314 corresponds with the policy for the driver shim 314. This step is performed after determining that the identity of the hypervisor 316 corresponds with the policy for the hypervisor 316.

Step 1114 includes restoring the driver shim 314 to a known-good state if the identity of the driver shim 314 does not correspond with the policy for the driver shim 314.

Step 1116 includes determining whether the identity of the user interface 150 corresponds with the policy for the user interface 150. This step is performed after restoring the driver shim 314 to a known-good state if the identity of the driver shim 314 does not correspond with the policy for the driver shim 314.

Step 1118 includes restoring the user interface 150 to a known-good state if the identity of the user interface 150 does not correspond with the policy for the user interface 150.

These steps are preferably performed in a strict order. In particular, the driver shim 314 is verified before the user interface 150. If the driver shim 314 is bad, then the user interface 150 is also assumed to be bad. The driver shim 314 is fixed before the user interface 150. Stated another way, according to one embodiment of the present invention the identity of the user interface 150 is assumed to not correspond with a policy for the user interface 150 if the identity of the driver shim 314 does not correspond with the policy for the driver shim 314.

Figure 12:
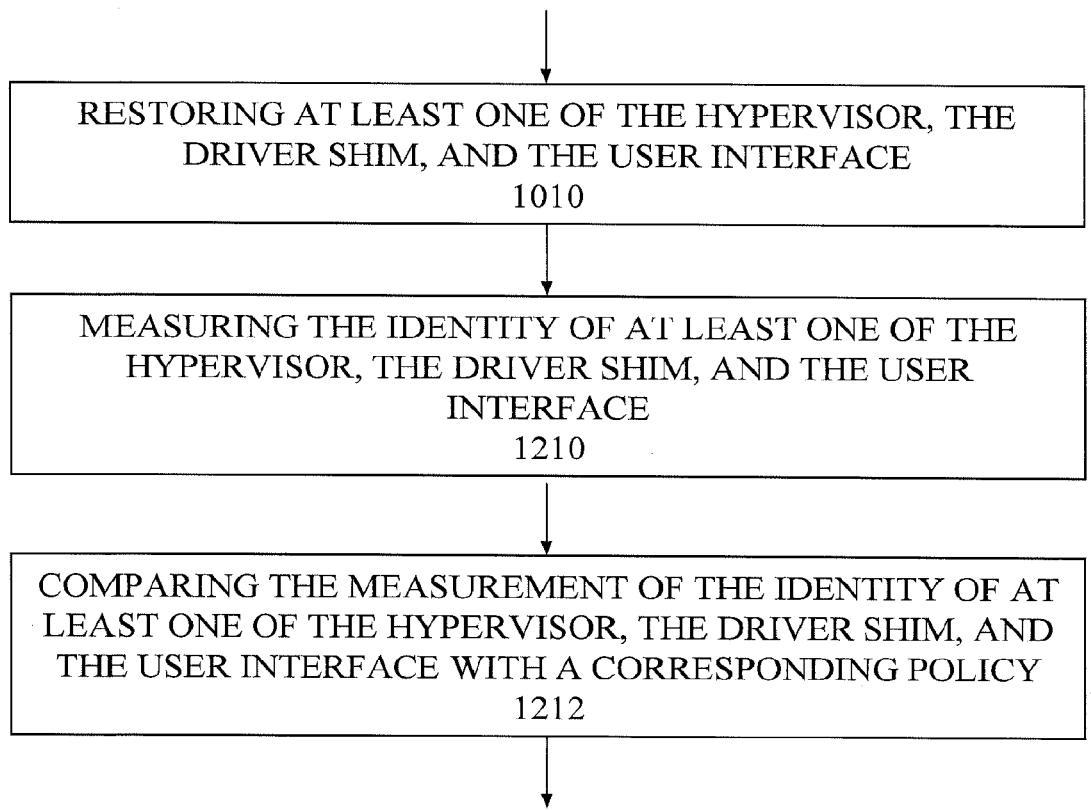

FIG. 12 illustrates another embodiment of the present invention. This embodiment includes additional steps after step 1010.

Step 1210 includes measuring the identity of at least one of the hypervisor 316, the driver shim 314, and the user interface 150 that was restored to a known-good state.

Step 1212 includes comparing the measurement of the identity of at least one of the hypervisor 316, the driver shim 314, and the user interface 150 that was restored to a known-good state with a corresponding policy for the at least one of the hypervisor 316, the driver shim 314, and the user interface 150.

Figure 13:
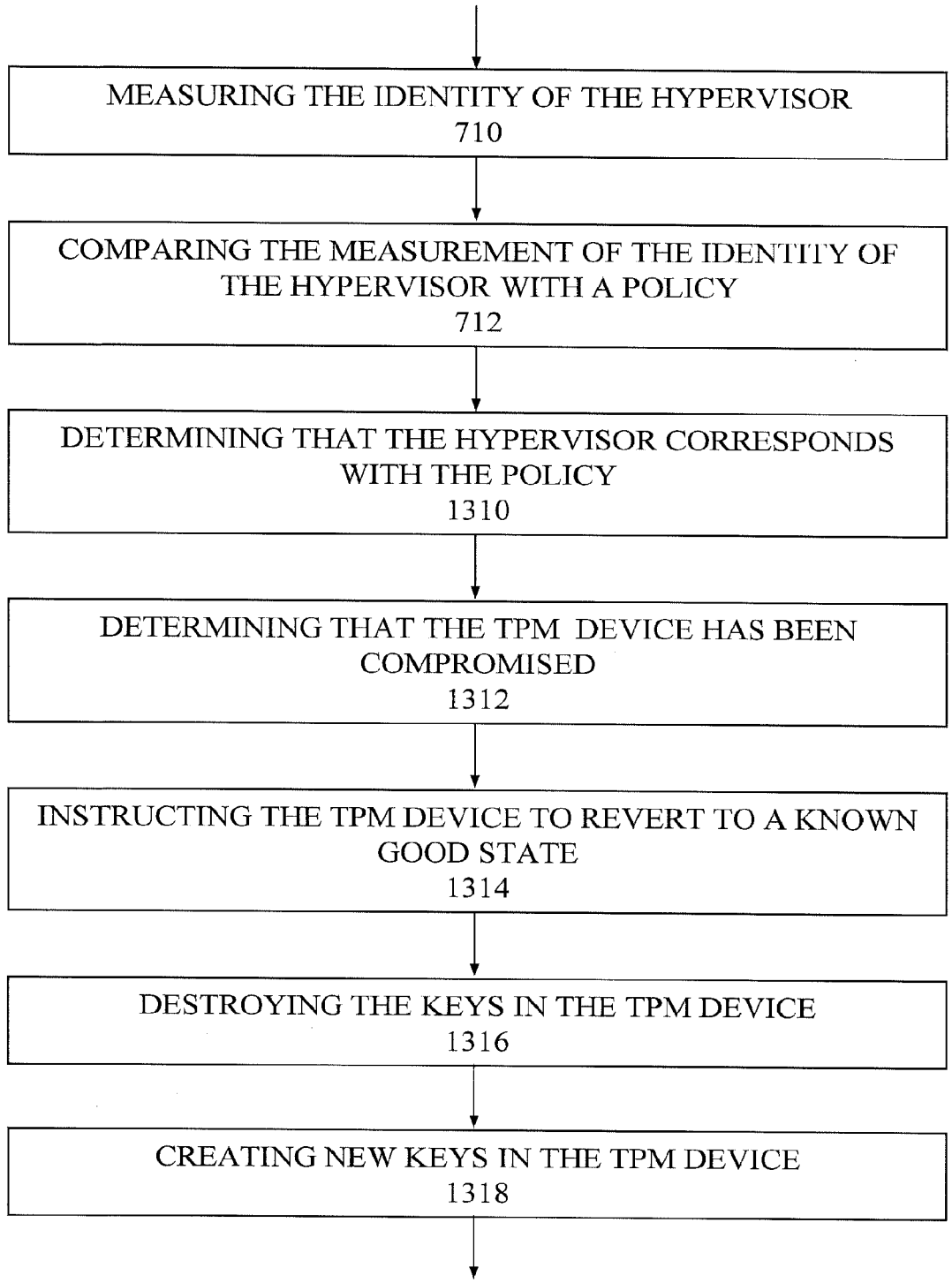

FIG. 13 illustrates another embodiment of the present invention. This embodiment includes additional steps after step 712

Step 1310 includes determining that the identity of the hypervisor 316 corresponds with the policy for the hypervisor 316.

Step 1312 includes determining that a TPM device has been compromised.

Step 1314 includes reverting the TPM device to a known good state. This step may be implemented, for example, by the hypervisor 316 sending appropriate instructions to the TPM device instructing the TPM device to revert to a known good state.

Step 1316 includes destroying the existing keys in the TPM device. This step may be implemented, for example, by the hypervisor 316 sending appropriate instructions to the TPM device.

Step 1318 includes creating new keys in the TPM device. This step may be implemented, for example, by the hypervisor 316 sending appropriate instructions to the TPM device.

Figure 14:
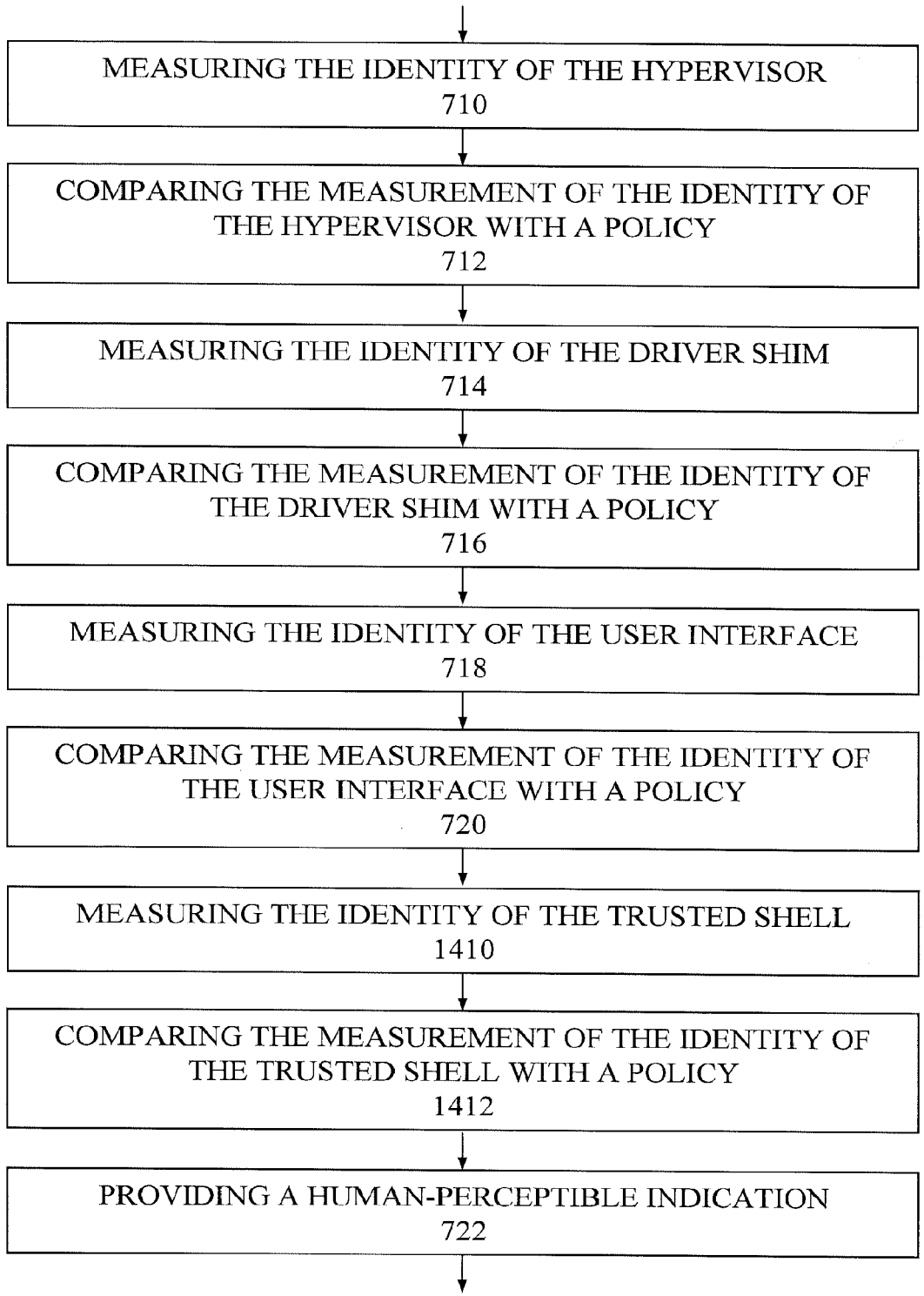

FIG. 14 illustrates another embodiment of the present invention in which the trusted path 152 includes a trusted shell.

Step 1410 includes measuring an identity of the trusted shell.

Step 1412 includes comparing the measurement of the identity of the trusted shell with a policy for the trusted shell. The policy for the trusted shell may be stored outside of the trusted path 152. For example, the trusted shell may be implemented in a computer 110, and the policy for the trusted shell may be stored in a device separate from the computer 110 in which the trusted shell is implemented.

Figure 15:
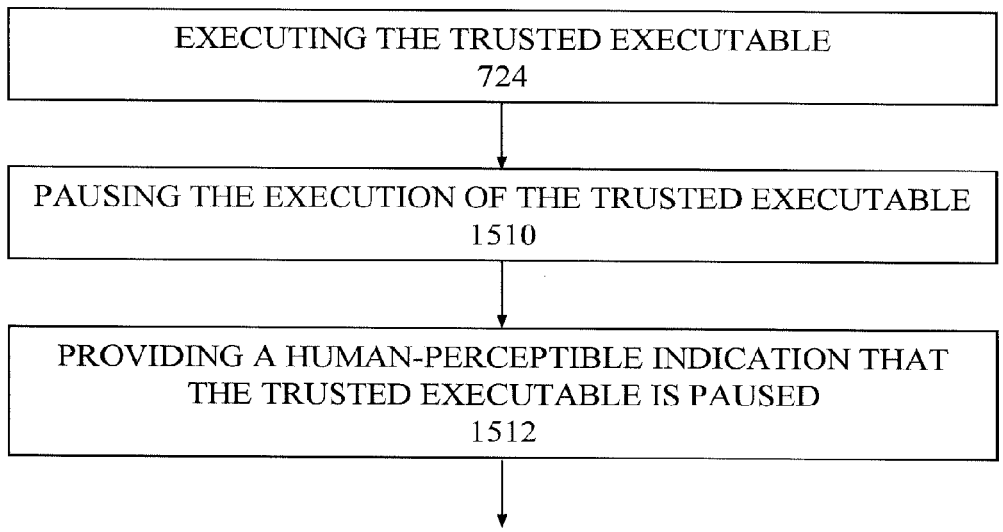

FIG. 15 illustrates another embodiment of the present invention in which additional steps are performed after step 724.

Step 1510 includes pausing the execution of the trusted executable 312.

Step 1512 includes providing a human-perceptible indication that the trusted executable 312 is paused.

Figure 16:
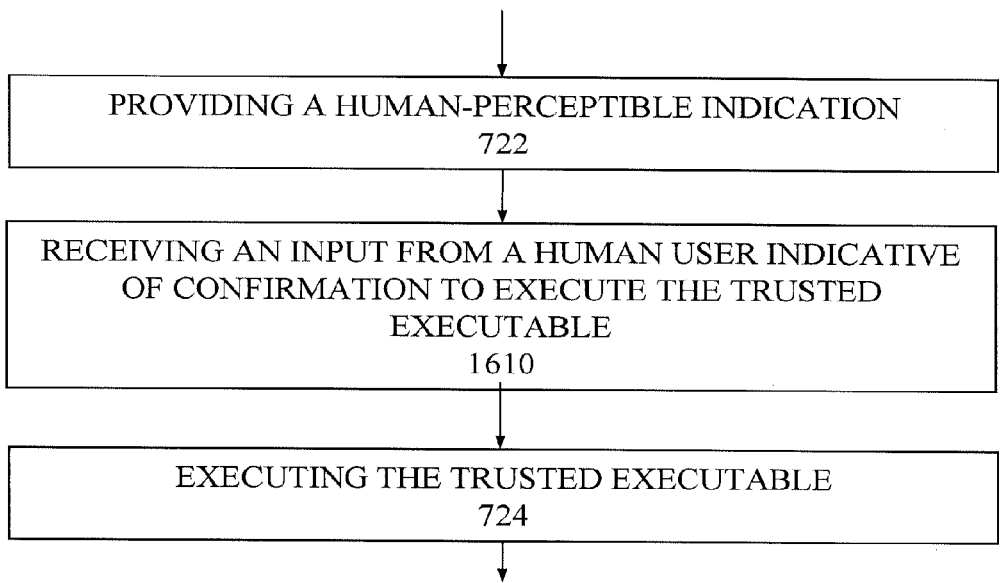

FIG. 16 illustrates another embodiment of the present invention in which additional steps are performed between steps 722 and 724.

Step 1610 includes receiving an input from a human user indicative of confirmation to execute the trusted executable 312.

1 Exemplary Embodiments 1.1 Overview

The present invention will now be described in terms of several specific embodiments. These embodiments are illustrative of the present invention, but the present invention is not limited to the specific embodiments illustrated and described herein.

1.2 Architecture Overview

Figure 17:
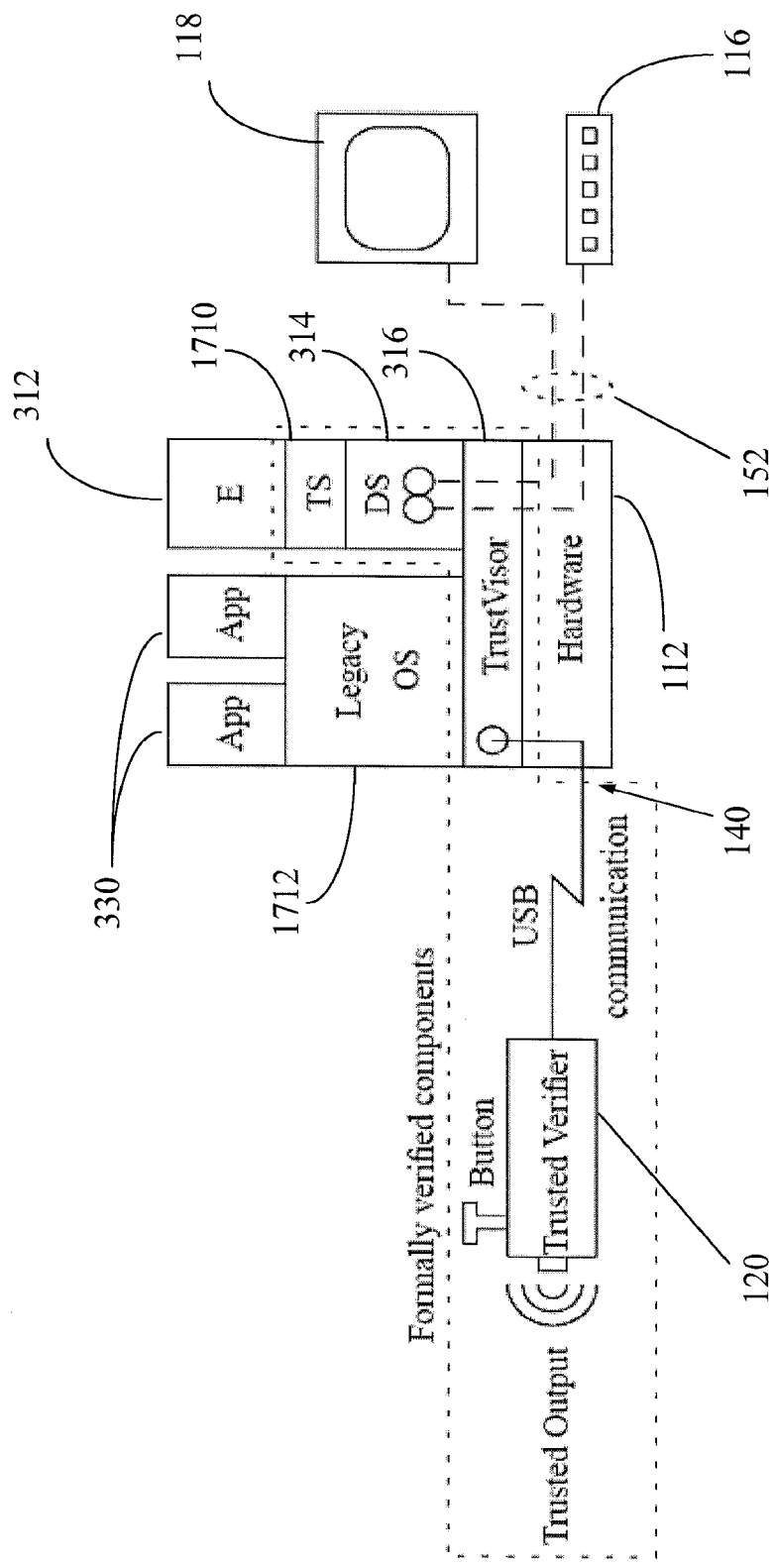
FIG. 17 illustrates one embodiment of a basic system architecture overview according to one embodiment of the present invention.

This section includes an overview of one embodiment of the architecture of the present invention (see FIG. 17). Since an important goal is to build a usable system, we first describe the steps that a user has to go through to set up a secure environment—the user experience. We then present the system components and operation, listing the steps that the system goes through to establish a secure environment. In the next section, we present details of the technical approach.

User Experience.

From a user's perspective, establishing a secure environment with trusted path for inputs and outputs proceeds as follows. By pressing a button on a Trusted Verifier device 120 (which connects to the PC, for example, via a USB interface and may be similar in size to a USB memory stick), the user can launch the secure environment that provides a trusted path 152 for inputs from the standard keyboard 116, and a trusted path for output on the standard display 118. If the secure environment is successfully established (which the Trusted Verifier 120 can check), the user may be alerted with, for example, a green LED lighting up on the device 120 and a brief "OK" beep emitted by a buzzer. If malware interferes with the establishment of the secure environment, the Trusted Verifier 120 will detect it and may, for example, light up a red LED on the device 120 and sound an alarm, alerting the user not to type any secrets into the keyboard 116 and not to trust anything appearing on the display 118.

System Components

The major components of the architecture, depicted in FIG. 17, include the Trusted Verifier 120 (referred to above as a Verification Device), TrustVisor 316 (referred to above as a hypervisor), and Trusted Application.

Trusted Verifier 120.

To achieve user-verifiable trusted paths in the presence of malware on standard PCs (the computer 110 will sometimes be referred to as a "PC"), we need an initial trusted entity. We propose a minimal additional device for this purpose that users can carry with them, which we call the Trusted Verifier. The Trusted Verifier may be a small device, similar to a USB memory stick, that connects to the PC via a USB interface and has minimal user I/O capability such as a multi-color LED, a buzzer, and a button. The Trusted Verifier provides minimal computation capabilities, sufficient for performing cryptographic operations during the verification of the PC environment.

TrustVisor 316.

TrustVisor is a core component of the system, implementing hypervisor functionality to execute a legacy OS, as well as providing the ability to execute standalone applications in strong isolation from the untrusted components in the legacy OS. TrustVisor also provides the trusted paths for input and output from the keyboard 116 to the trusted application 312, and from the trusted application 312 to the display 118. TrustVisor is further equipped with a verification function, which enables the Trusted Verifier 120 to check the correctness of the operation of TrustVisor 316.

Trusted Application.

The Trusted Application is composed of a Driver Shim 314 and a Trusted Shell 1710 to run an Executable 312 in an isolated execution environment, which is protected by TrustVisor 316 from any malware within the legacy OS 1712 space. (Section 1.3.3 provides more details on these components.) As FIG. 17 depicts, TrustVisor 316 provides trusted I/O to the trusted application space, via a driver in the Driver Shim 314. In one embodiment we plan to build two trusted executables 312 (denoted E in FIG. 17). The first will leverage the trusted path 152 to support secure disk encryption while the second will provide a mechanism for rekeying the endorsement key on a TPM chip in a trustworthy manner. Section 1.4 provides more details.

System Operation

The present invention will sometimes be referenced in terms of a system, which usually means the computer 110 and the verification device 120, which may or may not be integrated together. To illustrate the operation of the system, we now present the life cycle of one possible instantiation of the system. The scenario we consider is one in which the system is set up to establish a trusted environment with a Trusted Shell 1710 as the application, once the user presses the button on the Trusted Verifier 120 device.

In this example, we assume that the boot process of the PC is set up to load TrustVisor 316 first, which then loads and executes the legacy OS 1712. From a user's perspective, the system is indistinguishable from a legacy system at this stage. The user now connects her Trusted Verifier 120 device to the USB interface of the PC. To launch the Trusted Shell 1710, she presses the button on the Trusted Verifier 120. The Trusted Verifier 120 device first verifies the code and execution integrity of the TrustVisor 316, i.e., it checks that the expected TrustVisor 316 code is running and not a version possibly modified by malware or a malicious insider. For this purpose, the Trusted Verifier 120 and TrustVisor 316 engage in a software-based attestation protocol that we describe in more detail in Section 1.3.4. Other attestation protocols are also possible. A hardware-based attestation protocol could also be used. If the verification succeeds, the Trusted Verifier 120 lights up a green LED and sounds a "Success" beep; otherwise, it lights up a red LED and sounds an alarm.

To establish the trusted paths 152 for input and output, the TrustVisor 316 needs to clear the keyboard and display controllers from any potentially harmful configurations or code residues that may interfere with the trusted paths 152. For example, the keyboard could contain key re-mappings, or the display may be configured with a resolution such that the Trusted Shell 1710 would write outside the visible area. Hence, TrustVisor 316 resets all state and code associated with the keyboard 116 and display 118. TrustVisor 316 then loads the Trusted Shell 1710, verifies the code integrity by comparing the hash of the Trusted Shell 1710 to a known-good value, and starts executing it.

Note that if the system is compromised, TrustVisor 316 by itself cannot detect the intrusion and block execution. To illustrate this, consider a malicious insider that altered the TrustVisor code on the hard disk to tamper with the trusted paths 152. In this case, however, the Trusted Verifier 120 will detect the alteration and sound an alarm. The user is thus alerted to refrain from entering sensitive information.

1.3 Technical Approach Details

As we discuss in Section 1.2, this embodiment of the present invention includes three major components: a Trusted Verifier device 120, a secure hypervisor called TrustVisor 316, and the software-based attestation component. We now discuss each component in turn. FIG. 17 depicts a high-level overview of the system.

1.3.1 Trusted Verifier Device

The Trusted Verifier 120 device forms the root of trust for the user. The Trusted Verifier 120 may be such that the user can trust its correct operation. More specifically, according to one embodiment, the requirements of the Trusted Verifier 316 device are:

Correct operation: We need to ensure that the software executing on the Trusted Verifier 316 provides very high robustness against compromise. We plan to formally verify all software that will execute on the Trusted Verifier 316 (see Section 1.4.3).

Minimal input capabilities: The device 120 will have at least one button that the user can use to launch the trusted environment.

Minimal output capabilities: The device should have output capabilities to indicate different states. For example, an orange light would indicate that the trusted environment is not running, a green light would indicate that the trusted environment is running correctly, and a red light with an alarm beep would indicate that trusted environment is not running correctly or setup has failed.

The Trusted Verifier device 316 may include three LEDs (orange, green and red), one buzzer and one button. The LEDs will indicate the verification status of the system, the buzzer will provide acoustic feedback (an alarm sounds if the verification fails), and the button will be used to start the verification process. The LPC 2148 development board may be used as the hardware platform, which is a popular solution for developing USB peripherals. The Trusted Verifier 120 may be based on a LPC 214$x$ USB stack, a USB core stack handling the hardware interface and USB enumeration/configuration for the built-in USB device of LPC 214$x$ microcontrollers.

The Trusted Verifier device 316 may communicate with the PC via a USB link, as FIG. 17 indicates. In one embodiment the present invention will include a small standalone USB host controller device driver that will be integrated with TrustVisor 316. This will allow the present invention to avoid trusting the OS 1712 for communication with the Trusted Verifier 120.

Figure 18:
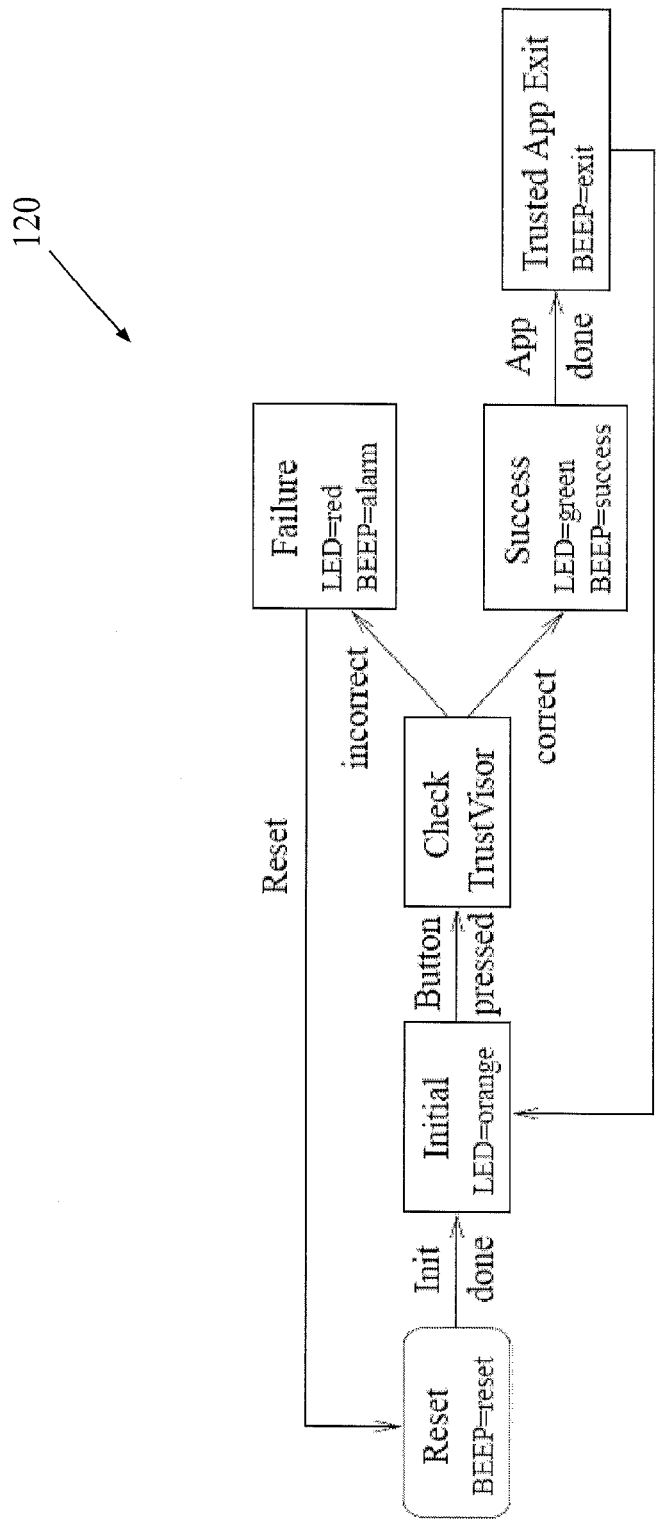
FIG. 18 illustrates one embodiment of a state machine of a trusted verifier according to the present invention.

FIG. 18 shows the state machine of the Trusted Verifier 120. When the Trusted Verifier 120 is first plugged into the PC, it stays in the initial state, lighting up the orange LED. TrustVisor 316 will periodically query the USB interface 140 for any command from Trusted Verifier 120. When the user presses the button on Trusted Verifier 120, it sends an attestation start command to TrustVisor 316. TrustVisor 316 gets the command and requests a challenge from Trusted Verifier 120. Based on the received challenge, TrustVisor 316 calls the verification function to compute the checksum value over itself and returns this value to Trusted Verifier 120. Section 1.3.4 explains the software-based attestation function in more detail. If TrustVisor 316 returns a wrong checksum value or returns a correct value too slowly, the Trusted Verifier 120 must assume that some malware may be present and alert the user by raising an alarm and turning on the red LED. Otherwise, the verification function will calculate the hash value of TrustVisor 316 and send it to the Trusted Verifier 120. If the hash value is incorrect, the Trusted Verifier 120 will alert the user. Otherwise, the green LED illuminates which means TrustVisor 316 is correct, and so the user can now trust the Trusted Application started by TrustVisor 316. After the Trusted Application exits, TrustVisor 316 notifies the Trusted Verifier 120, which returns to its initial state.

FIG. 19 shows a more detailed protocol diagram of the communication between TrustVisor 316 and the Trusted Verifier 120. Based on the simplicity of this exchange, we can thoroughly validate that the code on both components does not contain any security vulnerabilities.

Unfortunately, a time-of-check-to-time-of-use (TOCT-TOU) vulnerability needs to be prevented. If verification is successful, the Trusted Verifier 120 signals success to the user and the user now assumes a trusted path 152 for input and output. However, if the user is distracted for a moment, and the machine is somehow rebooted quickly without the user noticing, a malicious application could now present the expected screen on the display. Of course, the green light on the Trusted Verifier 120 will not be on but the user may not check. To help avoid this admittedly contrived vulnerability, we add a beep sound to indicate when the Trusted Verifier 120 device resets or is rebooted. Since all attached USB devices are reset when the PC resets, the beep is likely to alert the user.

1.3.2 TrustVisor:

A Trusted Security Hypervisor TrustVisor 316, the trusted hypervisor, may have the following requirements and properties:

1. Execute in isolation from the rest of the system while relying only on the CPU 112 and the memory controller, which form the TCB of the system.

2. Provide strong isolation to the Trusted Application 312 code from any malware that may be present on the system (without assistance from OS 1712).

3. Prove (attest) to the Trusted Verifier 120 that it is running the correct code in a completely isolated fashion.

4. Be amenable to formal verification to prove (in the mathematical sense) its security properties.

5. Should easily integrate into existing systems i.e., should not require a substantial effort to port existing systems to work with TrustVisor 316.

TrustVisor 316 executes at the privilege level of a Virtual Machine Monitor (VMM), which is the highest privilege level on the system. TrustVisor 316 relies on CPU-supported virtualization present in commodity CPUs from Intel and AMD, to execute in isolation from the rest of the system. However, virtualization support on other CPU architectures can also allow TrustVisor to be ported to those architectures. TrustVisor is not specific to the x86 architecture. The CPU 112 and memory controller provide hardware protection facilities to set up such isolation.

By executing at a higher privilege level than the OS 1712, TrustVisor 316 can offer strong isolation to the Trusted Application independent of the OS 1712. It can isolate the Trusted Application from all OS-level malware, such as kernel rootkits, as well as application level malware. Also, TrustVisor 316 can prevent malware from executing at the VMM privilege level. For example, the virtual-machine-based rootkits (VMBR) Blue Pill [31] or SubVirt [26] avoid detection by executing with VMM privilege.

As we describe in Section 1.3.4, the Trusted Verifier 120 can use the software-based attestation component of the system to verify that the TrustVisor 316 is executing the correct code in a completely isolated fashion. We have designed and implement TrustVisor 316 based on SecVisor, a previous security hypervisor developed by some of the inventors of the present invention [33]. Before presenting the details of TrustVisor 316, we present a brief overview of SecVisor.

SecVisor overview.

SecVisor is a tiny hypervisor that ensures code integrity for commodity OS kernels [33]. In particular, SecVisor ensures that only user-approved code can execute in kernel mode over the entire system lifetime. This protects the kernel against code injection attacks, such as kernel rootkits. SecVisor can achieve this property even against an attacker who controls everything but the CPU 112, the memory controller, and system memory chips. Further, SecVisor can even defend against attackers that have knowledge of zero-day kernel exploits.

SecVisor relies on hardware memory protections to achieve the property that only user-approved code can execute in kernel mode. SecVisor implements both software and hardware memory virtualization techniques. Both virtualization techniques require SecVisor to set up page tables for address translation. These page tables are also used by SecVisor to set hardware protections over memory.

The primary design goals of SecVisor are amenability to formal verification and the ease of porting commodity OSes. The code sizes of the runtime portions of the software and hardware memory virtualization versions of SecVisor are less than 2000 lines. Such a small code size makes SecVisor code amenable to formal verification tools. Also, porting the Linux kernel version 2.6.20 to run on SecVisor only required minimal changes, fewer than 100 lines of code needed to be changed out of approximately 4.3 million lines of code in the kernel.

TrustVisor 316 Design.

The hardware memory protections used by SecVisor can be modified to achieve the goal of TrustVisor 316, which is to isolate the Trusted Application from the rest of the system. A substantial component that we will implement for TrustVisor 316 is the ability to handle multiple executables and switch between them, in particular, the OS 1712 is one executable and the Trusted Application the other.

Reusing the code base of SecVisor enables TrustVisor 316 to automatically gain the desirable properties of SecVisor. This should make it possible to formally verify TrustVisor 316 and simplify its integration into existing systems. The formal verification of TrustVisor 316 will influence its design and implementation, because an important goal is to produce code that is amenable to verification.

1.3.3 The Trusted Application

Figure 20:
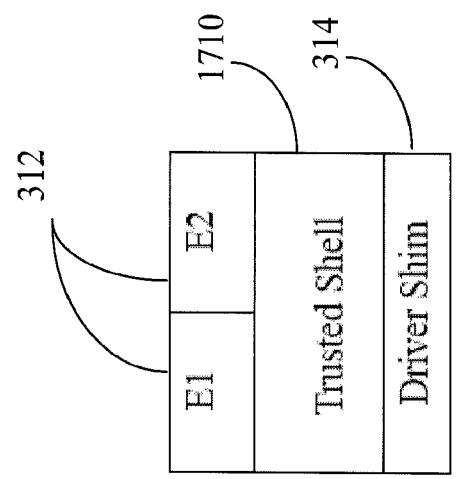
FIG. 20 illustrates one embodiment of the architecture of the trusted application according to the present invention. E1 and E2 are two executables.

The Trusted Application consists of multiple programs (referred to as executables 312), the Trusted Shell 1710, and the Driver Shim 314. The Trusted Shell 1710 offers a simple execution interface to the executables 312. FIG. 20 shows the architecture of the Trusted Application. We visualize the executables as being small, relatively self-contained programs, each of which performs one or at most a few, security sensitive operations. We give examples of two candidate executables in Section 1.4. The Trusted Application can contain an arbitrary number of executables 312, one or more of which will execute when the Trusted Application is invoked by TrustVisor 316.

The Driver Shim 314 is the device handling layer that has a keyboard and display driver. The Trusted Shell 1710 plays the role of a limited resource manager for the executables 312 and handles the user interface. The Trusted Shell 1710 can be thought of as the combination of a stripped down OS kernel and a very simple shell. The goal is to design the Trusted Shell 1710 so that its code is small and simple enough for formal verification. To achieve this goal, we keep the resource management functions of the Trusted Shell 1710 minimal. One technique we plan to leverage is to allow the untrusted legacy OS 1712 to perform any resource management functions that are not security-critical. Thus, the Trusted Shell 1710 only performs those resource management functions which cannot be performed by the OS without compromising security. In what follows, we describe the Driver Shim 314, the Trusted Shell 1710, and the executables 312 in more detail.

Driver Shim 314.

The Driver Shim 314 consists of a keyboard and display driver. The display driver supports only text mode, and is therefore very small and simple. Also, due to the menu-driven nature of the Trusted Shell 1710, the keyboard driver needs to support only a very limited number of keys (the arrow keys, the Enter Key, and the numeric keys). Hence, the keyboard driver is also very small and simple.

The main reason for having a display and keyboard driver within the Trusted Application is to enable the Trusted Application to control the keyboard and display independently of the OS. This enables setting up a trusted path 152 between the user and any executable within the Trusted Application since all user I/O is handled by the isolated partition. While we could place the Driver Shim 314 within TrustVisor 316, we choose to place it outside TrustVisor 316 to keep the code size of TrustVisor 316 minimal. This reduces the vulnerability of TrustVisor 316 to attacks.

Since the keyboard and the display are time multiplexed between the OS and the Trusted Application, there needs to be a way for the OS to relinquish control of these devices when it is suspended. Similarly, the Trusted Application should relinquish control of the keyboard and the display before passing control back to the OS. Otherwise, it is very likely that these devices could transition into unstable states and lock up the system.

We propose to build a Trusted Application Interface Module for the OS that resets the keyboard controller and the display controller before the OS is suspended. This enables the Trusted Application to use these devices without the risk of system lock-ups. Further, if the Interface Module fails to reinitialize devices correctly, TrustVisor 316 and the Driver Shim 314 can detect this and refuse to establish a TP. Similarly, before yielding control to the OS, the Driver Shim 314 also resets the keyboard controller and the display controller.

Trusted Shell 1710.

The Trusted Shell 1710 plays the role of a limited resource manager for the executables 312 and handles the user interface. In its role as the user interface handler, it offers a menu-driven interface to the user for invoking the different executables 312. In its role as a resource manager, it offers a simple scheduler, memory management facilities, and a program loading facility. The Trusted Shell 1710 also has a simple system call interface to enable the executables 312 to interact with it. We now describe the different components of the Trusted Shell 1710 in greater detail and estimate their complexity.

The menu interface offered by the Trusted Shell 1710 is very simple. It displays the list of executables available for execution. The user can, for example, use arrow keys or numeric keys to select one or more desired executables and invoke them by pressing the Enter Key. The present invention is, of course, not limited to specific key combinations or similar details provided in these examples.

In one embodiment of the invention, the Trusted Shell 1710 scheduler is a simple round-robin scheduler that executes all the executables selected by the user in turn. The context switch happens using cooperative multitasking, wherein the currently executing executable explicitly yields control of the CPU 112, by invoking the Trusted Shell 1710 using a system call. We anticipate the scheduler as being quite simple and small. Other variations are also possible.

The memory manager is responsible for handling memory allocations of varying sizes, ranging from multipage requests for loading executables to smaller requests made by dynamic memory allocation routines. It is also responsible for isolating the executables from each other. We believe that the memory manager need not be as complex as the memory manager of an OS since the executables are relatively simple.

The program loader within the Trusted Shell 1710 is capable of relocating binary images in the Executable and Linkable Format (ELF). The ELF standard is used by binaries present in several popular UNIX distributions and variants, including Linux. The ELF program loader is responsible for allocating memory for the executables and relocating the executable disk images so that they can execute from their assigned memory locations. Note that the memory manager of the program loader can be very simple since it only allocates memory for the executable images and does not support other dynamic memory allocations. Also, the relocation code is very small and simple, comprising approximately 100 lines of C code.

An important design decision we make that simplifies the program loader is that we allow the OS to load the executable binaries from disk. However, note that other designs are possible. This eliminates the need to have file system and disk drivers in the program loader. However, this mandates a way to verify the integrity of the executable images, since they are loaded by the untrusted OS. The common technique used to verify integrity of executable code is to have a Trusted Verifier 120 compute the cryptographic hash of the executable and check the result against a known good value. The program loader can hold known good hashes of the executables and compare the hash of the executable disk image, loaded by the OS, against these values.

The system call interface offered by the Trusted Shell 1710 consists of I/O system calls for using the keyboard and the display, data transfer system calls for transferring data between the executables and the OS, and the yield system call that allows an executable to yield control of the CPU 112. The I/O system calls consist of terminal line discipline functions and make use of the Driver Shim 314 to access the hardware. The data transfer system calls are required to pass data between the OS and the executables. Finally, the yield system call is required for cooperative multitasking.

Executables. We visualize the executables as being small, relatively self-contained programs, each of which performs one or at most a few, security sensitive operations. We give examples of two candidate executables in Section 1.4. While we currently believe that the executables have to be ported to execute using the system call interface offered by the Trusted Shell 1710, we will also consider whether it is possible design the Trusted Shell 1710 system call interface so that it is possible to execute unmodified programs as executables, while keeping the Trusted Shell 1710 simple.

The Trusted Application can contain an arbitrary number of executables, one or more of which will execute when the Trusted Application is invoked by TrustVisor 316. The context switch between the executable happens using cooperative multitasking. The currently executing executable yields control of the CPU 112 by calling the yield system call. The Trusted Shell 1710 then schedules another executable for execution.

Since the executables perform security sensitive operations, it is likely that some of them will have secrets in their memory. This requires power-down and suspend events to be handled carefully, to prevent executables' secrets from being leaked. Either a power-down event or a suspend event should cause the executables to erase secrets from their memory, before the event is completed. Otherwise, the attacker could read the secrets from memory on the next power-up or resume.

1.3.4 Software-based Attestation and Verifiable Code Execution

In this section, we describe the component of the system that will be used to enable the Trusted Verifier 120 device to obtain assurance that TrustVisor 316 is correctly executing in isolation of any malware. Since the technology is quite new, we provide much technical detail about the system design and pointers to implemented systems. We then describe alternatives or improvements that can be implemented in the present invention to make the system more robust.

The component for externally-verifiable code execution enables an external entity (the verifier) to obtain an assurance that the execution of an arbitrary piece of code, called the target executable, on a computing device is not tampered with by any malware that may be present. Assuming that the target executable is self-contained, i.e., it does not invoke any other code during its execution and that the target executable does not contain any software vulnerabilities, externally-verifiable code execution is equivalent to the following two guarantees:

1. Correct invocation: The verifier obtains the guarantee that the correct target executable image is loaded into memory and invoked for execution.

2. Untampered execution: No malware that may exist on the computing device can interfere with the execution of the target executable in any manner.

Both software-based and hardware-based techniques for externally-verifiable code execution have been proposed. Both classes of techniques rely on a root of trust on the computing device. The root of trust is a trusted computing base that is responsible for enforcing externally-verifiable code execution. The root of trust performs an integrity measurement of the target executable, sets up appropriate protections to isolate the target executable from all other software running on the computing device, and invokes the target executable for execution. The root of trust also sends the integrity measurement to the verifier over an authenticated communication channel. The verifier, who knows the correct value of the target executable's integrity measurement, uses the received integrity measurement to verify if the correct target executable was invoked for execution. Also, since the execution of the target executable is isolated from all other software on the computing device, the verifier obtains the guarantee of untampered execution of the target executable.

In two widely available hardware-based approaches for externally-verifiable code execution, the Secure Virtual Machine (SVM) [2] technology by AMD and the Trusted Execution Technology (TXT) [23] by Intel, the root of trust is composed of a subset of the computing device's hardware. In the proposed system we leverage software-based attestation mechanisms to build a system that does not rely on any secrets for its operation. Not requiring any secrets is a tremendous advantage, because this removes the need to keep any secrets, thereby removing numerous avenues of attack. However, variants of the present invention that leverage hardware roots of trust are also possible.

In software-based techniques for externally-verifiable code execution, the root of trust is established dynamically, i.e., on-demand [32]. In Pioneer, the computing device has a self-checksumming function called the verification function, which computes a checksum over its own instruction sequence. The verification function also sets up an isolated execution environment for itself wherein its execution is isolated from all other software on the computing device. The isolated execution environment guarantees that no malware on the computing device can interfere with the execution of the verification function. If the attacker modifies the verification function in any manner or fakes the creation of the isolated execution environment, the checksum computed by the verification function will be incorrect. If the attacker tries to forge the correct checksum despite having a modified verification function or an incorrectly created isolated execution environment, the time taken to compute the checksum will increase noticeably. Thus, the verifier obtains assurance that the verification function on the computing device is unmodified and the isolated execution environment is correctly set up if the following two conditions hold:

1. The checksum returned by the computing device is correct.
2. The checksum is returned within the expected amount of time.

When these two conditions hold, the verifier obtains the guarantee that a dynamically-created root of trust in the form of the verification function exists on the computing device.

Assumptions.

We assume that the verifier knows the exact hardware configuration of the computing device, including the CPU model, the CPU clock speed, and the memory latency. We also assume that the CPU 112 of the computing device is not overclocked.

We also assume that the target executable is self-contained, i.e., it does not invoke any other software on the computing device during its execution. Also, the target executable can execute at the highest CPU 112 privilege level without generating exceptions and with all interrupts turned off.

Attacker Model.

We assume an attacker who has complete control over the software of the computing device. In other words, the attacker can tamper with all software, including the OS, and inject arbitrarily malicious software into the computing device. However, we assume that the attacker does not modify the hardware. For example, the attacker does not load malicious firmware onto peripheral devices such as network cards or disk controllers, or replace the CPU 112 with a faster one. In addition, the attacker does not perform Direct Memory Access (DMA) attacks like scheduling a DMA-write causing a benign peripheral device to overwrite the memory regions containing the verification function or the target executable.

Verifiable Code Execution Overview.

Figure 21:
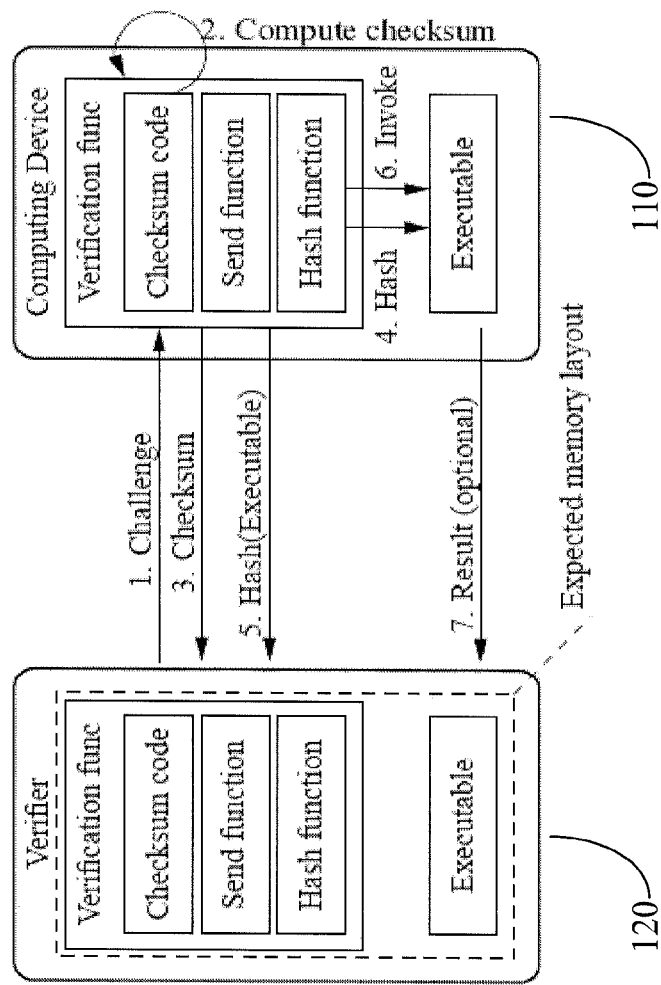
FIG. 21 illustrates one embodiment of an overview of the verifiable code execution protocol according to the present invention. The numbers represent the temporal ordering of events

The verification function is responsible for instantiating the root of trust dynamically on the computing device. As shown in FIG. 21, the verification function consists of three parts: a checksum code, a send function and a hash function. The checksum code computes the checksum over the instructions of the verification function and also sets up an isolated execution environment for the execution of the verification function. After the checksum code finishes computing the checksum, it invokes the send function to transfer the checksum to the verifier over the communication channel. After sending the checksum back to verifier, the checksum code invokes the hash function which computes the integrity measurement of the target executable by computing a hash over the executable image. The hash function returns the hash of the target executable to the verifier using the send function and invokes the target executable. Since the target executable is directly invoked by the hash function which executes in the isolated execution environment set up by the checksum code, the target executable inherits the same isolated execution environment. Also, the target executable is self-contained. Hence, it is guaranteed that no malware on the computing device can affect the execution of the target executable.

The isolated execution environment enforces the atomicity of execution of the verification function and the target executable. That is, no other code on the computing device is allowed to execute until the verification function and the target executable have finished executing. This atomicity is achieved by ensuring that the verification function and the target executable execute at the highest CPU 112 privilege level with all maskable interrupts turned off. Also, as part of the checksum computation process, new handlers that are part of the verification function image are installed for all non-maskable interrupts and exceptions. Since the target executable is self-contained, no code other than that in the verification function or the target executable can execute as long as either of these two entities is executing.

Pioneer is based on a challenge-response protocol between the verifier and the computing device. FIG. 22 shows the Pioneer protocol. The verifier invokes the verification function on the computing device by sending a random nonce as the challenge. The checksum code in the verification function computes the checksum over the verification function's instruction sequence as a function of the random nonce. Using a random nonce prevents pre-computation and replay attacks. The checksum code sends the computed checksum back to the verifier using the send function. The verifier has a copy of the verification function and can hence independently compute the checksum. The verifier verifies the correctness of the checksum returned by the computing device and that the checksum is returned within the expected amount of time. If these two conditions are met, the verifier obtains the guarantee that the root of trust has been correctly instantiated on the computing device. After sending the checksum back to the verifier, the checksum code invokes the hash function which computes a hash of the target executable image concatenated with the random nonce sent by the verifier. The hash function then sends the hash of the target executable back to the verifier. The verifier verifies the correctness of the hash value using its own copy of the target executable image. Note that if the checksum returned by the computing device was successfully verified by the verifier earlier, the verifier knows that the hash function is unmodified and it executes in an isolated execution environment. Hence, the verifier obtains the guarantee that the hash function correctly hashes the target executable image. Finally, the hash function invokes the target executable for execution.

Second Generation Pioneer Checksum Function

We have developed a second-generation Pioneer checksum function that provides a higher attacker time overhead than the first generation function [32]. The high-level idea is to exploit the large difference between CPU and memory speeds: The attacker's checksum function will be forced to access memory while the correct checksum function will not perform any memory accesses. The memory accesses will slow down the attacker's checksum computation. We construct a space optimal checksum function that fills the CPU's level 1, level 2, and (if applicable) level 3 caches. Since the attacker's checksum function will be larger it will not fit in the CPU's caches, thereby forcing the attacker to perform memory accesses.

In addition to having an increased attacker overhead, the second-generation checksum function will also operate securely on 32-bit x86 CPUs with protected mode segmentation support, address all virtual memory-based attacks, and can deal with untrusted System Management Mode (SMM) handlers. The checksum function executes in real mode, thereby denying the attacker the use of protected mode segmentation. Operating in real mode also allows us to address all virtual memory-based attacks. These attacks cannot happen since paging is not enabled in real mode. Finally, the checksum function registers will execute in SMM, making it unnecessary to trust the SMM handler.

These enhancements make the second generation checksum function substantially more secure than the first generation function.

1.4 Evaluation

We demonstrate the applicability of the system by building two important security applications. The first application leverages the trusted path 152 to support secure disk encryption while the second provides a mechanism for rekeying the endorsement key on a TPM chip in a trustworthy manner. In addition, a major part of the security evaluation of the system will involve a rigorous formal analysis of its various components in order to provide end-to-end security guarantees. This integration of secure system design, implementation, and analysis gives our invention an advantage and is a distinctive feature of the present invention.

1.4.1. Disk Encryption

There is a strong need for security mechanisms that protect sensitive information stored on portable devices such as laptops. This is particularly relevant given the recent spate of privacy loss incidents resulting from laptop theft. A popular approach to address this problem is to encrypt the data stored on the disk using a key derived from a user-supplied password. A serious weakness of the current approach is that the key and the user's password are vulnerable when the computing device is in use. For example, the attacker could install a keystroke logger to sniff the user's password, or it could compromise the OS to steal the secret key from memory. Using our invention, one can build an application that leverages the trusted path 152 set up using our system to provide secure disk encryption even in the face of malware and insider attacks. The user's password and secret key will only be accessible within the trusted path 152 to the trusted components—a Trusted Application and TrustVisor 316. The user experience will be straightforward—exactly as described in Section 1.2 with the option to choose to encrypt or decrypt the disk.

1.4.2. Trusted Platform Module (TPM) Configuration

This application supports the rekeying of the endorsement key on a Trusted Platform Module (TPM) chip [36], thus allowing recoverability from key compromise (an issue raised above). TPM chips ship with a Certified Endorsement Keypair (EK) from the manufacturer. This keypair is a 2048-bit RSA keypair used exclusively for encryption and decryption. The EK serves as the TPM's ultimate identity. The EK Certificate from the manufacturer is designed to help convince third parties that the TPM adheres to the TCG specification [36]. Unfortunately, due to their low cost, TPM chips are not tamper-proof. In high security applications, it may be desirable to achieve a guarantee that the TPM's EK was generated on-chip such that its private component has never been exposed to the outside world. TPM manufacturers have the option to set a TPM's EK as revocable, enabling a command that will destroy the EK in a TPM when a manufacturer-supplied secret (EK Reset) is provided as a parameter. One of two additional commands can be used to cause the TPM to internally generate a new EK and optionally assign a new EK Reset value required to revoke the new EK.

When a new EK is generated internally by the TPM, no certificate is created to convince third parties that the EK corresponds to a valid TPM. Thus, the entity (e.g., system administrator) that invokes the creation of the new EK must bear the responsibility of certifying that the new EK was generated properly. On a platform that may contain malicious BIOS or SMM code, it is challenging to obtain a guarantee that the EK was generated correctly in-TPM.

We can design and build a dedicated application, EKapp, that can accept input from a physically present administrator and issue the necessary TPM commands to create a new EK pair. EKapp will run as a Trusted Application (including the Driver Shim 314 and Trusted Shell 1710) directly on TrustVisor 316, as in FIG. 17. TrustVisor 316 can offer as one available function the invocation of EKapp. When executed, EKapp checks the state of the TPM's EK and classifies it into one of three states:

1. Valid and Revocable
2. Valid and Permanent
3. Revoked

The EKapp will enable a user to configure the TPM to transition from State 1 to State 3 if the user can demonstrate possession of EK Reset, and from State 3 to States 1 (by providing a new EK Reset value) or 2. The EKapp is unable to make any configuration changes to a TPM with an EK in State 2, as the EK remains permanently installed in that TPM for the duration of its existence.

1.4.3. Formal Analysis

Our invention is designed to facilitate a rigorous security analysis of the designed system at both the architecture and implementation levels. The analysis will consist of the following parts:

1. We foresee embodiments of the present invention in which we will develop a precise model of the system and the attacker, and a specification and verification of the security properties of the system architecture, in particular, the properties (1)-(3) described in the introduction. Furthermore, the analysis will also explicitly identify the TCB and the expected properties from the TCB. The technical approach will build on our prior and ongoing work on Protocol Composition Logic (PCL) [9, 10, 11, 12, 13, 14, 15, 16, 17, 21, 30], which is a logic for specifying and verifying security properties of network protocols. We envision that the form of reasoning supported by PCL will be applicable to the trusted computing domain, based in part on an ongoing formal study of TCG protocols [18]. However, there is also going to be a significant amount of technical work involved in extending the syntax, semantics and proof system of PCL to formally reason about trusted computing systems. Specifically, we will have to extend the process-based model of PCL to allow for shared memory between processes in order to faithfully model relevant system properties such as the isolation guarantees afforded by a TrustVisor 316-style hypervisor. At a high-level, this component of the formal analysis task will draw on techniques from mathematical logic and programming language design and analysis.

2. Our design enables verification that the TCB actually satisfies the expected properties identified in the previous step, i.e., we can verify that the system implementation satisfies property (4) described in the introduction. This step can be carried out using software model-checking techniques. Specifically, we can analyze the code for the security hypervisor using (and extending if necessary) an appropriate software model-checker. In an ongoing effort, we are experimenting with model-checkers for C programs, in particular MAGIC [6] and CMBC [8]. In recent work, we have used a C model-checker to verify the OpenSSL implementation of the SSL handshake protocol for semantic security properties (authentication and confidentiality) [7]. Analyzing a security hypervisor with a small code base (such as SecVisor [33]) and limited concurrency for security properties such as isolation are within the reach of current model-checkers. We can also verify the device driver for the Trusted Verifier 120 Device using a software model-checker in order to provide assurance that it behaves in the expected manner. Our experience with software model-checkers and the recent success in device driver verification indicates that this is a reasonable goal (see, e.g., the SLAM project at Microsoft Research [3]).

1.5 Technical Program Summary

In the present invention we identify the key properties for establishing user-verifiable trusted paths 152, which is a fundamental construct of any secure system. These properties ensure that secure user communication with a Trusted Shell 1710 can take place even in the presence of malware and malicious insiders. Attacks by malware and malicious insiders could corrupt low-level boot sequences of both static and dynamic root of trust measurements proposed by the Trusted Computing Group (TCG)—the only other option available to date for building trusted paths 152 in a commercially available computing platform. Yet the TCG proposals lack a provable mechanism that withstands attacks which could lead to the discovery of private keys of the Trusted Platform Module and would render any trusted path 152 establishment (e.g., based on attestation) insecure, unverifiable, and unrecoverable by a user. In contrast to the TCG proposals, the trusted path 152 mechanism would be persistent, user-verifiable, and recoverable in the face of the strongest adversary defined to date. Further, the mechanism would be formally verified and thus would guarantee a level of assurance not achievable by other similar systems.

A distinctive feature of the TP design is that it does not rely on hardware-protected secrets anywhere in the system. Hence, the design eliminates a large attack surface of the system and facilitates trusted recovery from private (and secret symmetric) key compromise for other system components. It also enables the bootstrapping of application-level, user-verified TP, possibly using hardware-protected secret keys—as suggested by the TCG proposals—that can be changed in a secure, practical manner by the user himself/herself and by a trusted third party. Most importantly, the design enables users to execute off-the-shelf applications (e.g., Windows, Linux) that are not expected to be either malware-free or operate in environments free of insider attacks.

The approach requires the development of a Trusted Verifier 120 device that would plug into the USB port of a computing device and would communicate with the TrustVisor 316—a component that executes on the computing device and provides small hypervisor functionality that supports the legacy OS 1712. TrustVisor 316 also implements trusted path 152 functions and is equipped with a verification function that enables the Trusted Verifier 120 to check the correctness of TrustVisor 316 operation. The TrustVisor 316 is used to extend trusted path 152 functionality to user applications. A key advantage of the user-pluggable (removable) Trusted Verifier 120 is its separability and operational independence from a computing device under attack; i.e., it need not be on-line until and unless a trusted path 152 is being established. TrustVisor 316 is designed in such a way that malware and malicious insiders cannot access its internal state and hence the integrity of the verification function it performs can be assured.

To summarize, we design, build and formally verify one of the most fundamental security mechanisms of any computing system that would withstand attacks from the most powerful adversary known to date. We envision that a system like ours would be essential in sensitive and high-value applications, such as command and control systems, cryptographic transactions, financial transactions, and on-line forensic analysis, in the presence of malware and malicious insider attacks.

1.6 Risk Analysis and Alternatives

Experience with the design and operation of secure systems for the past three decades indicates that three generic risk factors dominate all others in the system security area, namely (1) user/administrator/operator errors in using secure systems, (2) design and implementations errors (i.e., bugs or excessive complexity) in the development of secure systems, and (3) system configuration errors.

In the context of the present invention, the design of human factors that mitigate possible user errors play a key role. One potential vulnerability (mentioned earlier) is where a distracted user may not notice a machine reboot after performing TP verification. We addressed this potential time-of-check-time-of-use vulnerability by adding a "sound dimension" to the TP verification, not just a visual indicator. Being keenly aware of the importance of human factors to security mechanism design and use, we intend to perform an extensive usability analysis of the design, taking advantage of the significant resources dedicated to human factors research at CyLab (e.g., Professor Lorie Cranor's group has conducted extensive research and evaluated numerous designs in the area of human factors and is currently focusing on access control usability). Reviews and evaluation of human factors in trusted path 152 operation will constitute a major source of design alternatives, which are possible with the present invention.

The present invention anticipates the possibility that a TP technology, which forms an important basis of trust in any secure system, may contain design and/or implementation errors. Such errors would lead to failures to achieve precisely the goals that make the present invention indispensable to any secure system operation. The present invention may be modified to remove this risk in two important ways. First, by defining a precise adversary model that would identify the threats the trusted path 152 mechanisms intend to counter and show that the design counters those threats in an effective way. Second, is formal verification of the trusted path 152 technology. In fact, property (4) of our definition for a trusted path 152 calls for the formal analysis and verification of the mechanisms. To achieve this would gain significant assurance that the risk of bugs does not afflict the TP mechanisms.

Finally, we intend to explicitly address the area of trusted path 152 configuration errors by identifying the potential sources for such errors. For example, the software attestation approach, which is the basis of the user-verifiable trusted path 152 mechanism, assumes that the Trusted Verifier 120 knows the exact hardware configuration of the computing device, including the CPU model, clock speed, and memory latency. Software attestation also assumes that the target executable that is being attested is self-contained. That is, its configuration assumed by the Trusted Verifier 120 does not change; e.g., it does not invoke other software on the computing device during execution. Configuration mismatches in these areas could lead to security breaches in the user verification the of trusted path 152 and, for this reason, we intend to build in configuration validation checks wherever such checks become necessary; e.g., in the TrustVisor 316. All areas of configuration validation will be addressed in the design of the system.

CONCLUSION

Although the present invention has generally been described in terms of specific embodiments and implementations, the present invention is applicable to other methods, apparatuses, systems, and technologies. The examples provided herein are illustrative and not limiting, and other variations and modifications of the present invention are contemplated. Those and other variations and modifications of the present invention are possible and contemplated, and it is intended that the foregoing specification and the following claims cover such modifications and variations.

REFERENCES

[1] TPM reset attack. Available at http://www.cs.dartmouth.edu/~pkilab/sparks. Checked on Feb. 7, 2008.

[2] Advanced Micro Devices. AMD64 virtualization: Secure virtual machine architecture reference manual. AMD Publication no. 33047 rev. 3.01, May 2005.

[3] Thomas Ball, Ella Bounimova, Byron Cook, Vladimir Levin, Jakob Lichtenberg, Con McGarvey, Bohus Ondrusek, Sriram K. Rajamani, and Abdullah Ustuner. Thorough static analysis of device drivers. In *EuroSys*, pages 73-85, 2006.

[4] Dan Boneh, Richard A. DeMillo, and Richard J. Lipton. On the importance of eliminating errors in cryptographic computations. *Journal of Cryptology*, 14(2):101-119, 2001.

[5] David Brumley and Dan Boneh. Remote timing attacks are practical. In *Proceedings of USENIX Security Symposium*, pages 1-14, August 2003.

[6] Sagar Chaki, Edmund M. Clarke, Alex Groce, Somesh Jha, and Helmut Veith. Modular verification of software components in c. *IEEE Trans. Software Eng.*, 30(6):388-402, 2004.

[7] Sagar Chaki and Anupam Datta. Automated verification of security protocol implementations, 2008. Technical Report CMU-Cylab-08-002.

[8] Edmund Clarke, Daniel Kroening, and Flavio Lerda. A tool for checking ANSI-C programs. In Kurt Jensen and Andreas Podelski, editors, *Tools and Algorithms for the Construction and Analysis of Systems* (TACAS 2004), volume 2988 of *Lecture Notes in Computer Science*, pages 168-176. Springer, 2004.

[9] Anupam Datta, Ante Derek, John C. Mitchell, and Dusko Pavlovic. A derivation system for security protocols and its logical formalization. In *Proceedings of 16th IEEE Computer Security Foundations Workshop*, pages 109-125. IEEE, 2003.

[10] Anupam Datta, Ante Derek, John C. Mitchell, and Dusko Pavlovic. Secure protocol composition (extended abstract). In *Proceedings of ACM Workshop on Formal Methods in Security Engineering*, pages 11-23, 2003.

[11] Anupam Datta, Ante Derek, John C. Mitchell, and Dusko Pavlovic. Abstraction and refinement in protocol derivation. In *Proceedings of 17th IEEE Computer Security Foundations Workshop*, pages 30-45. IEEE, 2004.

[12] Anupam Datta, Ante Derek, John C. Mitchell, and Dusko Pavlovic. Secure protocol composition. In *Proceedings of 19th Annual Conference on Mathematical Foundations of Programming Semantics*. ENTCS, 2004.

[13] Anupam Datta, Ante Derek, John C. Mitchell, and Dusko Pavlovic. A derivation system and compositional logic for security protocols. *Journal of Computer Security*, 13(3): 423-482, 2005.

[14] Anupam Datta, Ante Derek, John C. Mitchell, Vitaly Shmatikov, and Mathieu Turuani. Probabilistic polynomial-time semantics for a protocol security logic. In *Proceedings of the 32nd International Colloquium on Automata, Languages and Programming (ICALP '05)*, Lecture Notes in Computer Science, pages 16-29. Springer-Verlag, 2005.

[15] Anupam Datta, Ante Derek, John C. Mitchell, and Bogdan Warinschi. Computationally sound compositional logic for key exchange protocols. In *Proceedings of 19th IEEE Computer Security Foundations Workshop*, pages 321-334. IEEE, 2006.

[16] Nancy Durgin, John C. Mitchell, and Dusko Pavlovic. A compositional logic for protocol correctness. In *Proceedings of 14th IEEE Computer Security Foundations Workshop*, pages 241-255. IEEE, 2001.

[17] Nancy Durgin, John C. Mitchell, and Dusko Pavlovic. A compositional logic for proving security properties of protocols. *Journal of Computer Security*, 11:677-721, 2003.

[18] Deepak Garg, Jason Franklin, Dilsun Kaynar, and Anupam Datta. Towards a theory of secure systems, 2008. Technical Report CMU-Cylab-08-003.

[19] Blaise Gassend, Dwaine Clarke, Marten van Dijk, and Srinivas Devadas. Silicon physical random functions. In *Proceedings of the 9th ACM Conference on Computer and Communications Security*, pages 148-160, November 2002.

[20] V. Gligor, C. Burch, R. Chandersekaran, L. Chanpman, M. Hecht, W. Jiang, G. Luckenbaugh, and N. Vasudevan. On the design and the implementation of secure xenix workstations. In *Proceedings of the IEEE Symposium on Research in Security and Privacy*, pages 102-117, April 1986.

[21] Changhua He, Mukund Sundararajan, Anupam Datta, Ante Derek, and John C. Mitchell. A modular correctness proof of IEEE 802.11i and TLS. In *CCS '05: Proceedings of the 12th ACM conference on Computer and communications security*, pages 2-15, 2005.

[22] M. S. Hecht, M. E. Carson, C. S Chandersekaran, R. S. Chapman, L. J. Dotterer, V. D. Gligor, W. D. Jiang, A. Johri, G. L. Luckenbaugh, and N. Vasudevan. UNIX without the superuser. In *Proceedings of Summer USENIX Technical Conference*, 1987.

[23] Intel Corporation. LaGrande technology preliminary architecture specification. Intel Publication no. D52212, May 2006.

[24] Intel Corporation. Trusted eXecution Technology—preliminary architecture specification and enabling considerations. Document number 31516803, November 2006.

[25] Bernhard Kauer. OSLO: Improving the security of Trusted Computing. In *Proceedings of the USENIX Security Symposium*, August 2007.

[26] Samuel T. King, Peter M. Chen, Yi-Min Wang, Chad Verbowski, Helen J. Wang, and Jacob R. Lorch. SubVirt: Implementing malware with virtual machines. In *Proceedings of the IEEE Symposium on Research in Security and Privacy*, May 2006.

[27] Paul Kocher, Joshua Jaffe, and Benjamin Jun. Differential power analysis. In *Advances in Cryptology—CRYPTO*, pages 399-397, 1999.

[28] K. Kursawe, D. Schellekens, and B. Preneel. Analyzing trusted platform communication. In *Proceedings of CRASH Workshop: Cryptographic Advances in Secure Hardware*, September 2005.

[29] Jonathan M. McCune, Adrian Perrig, and Michael K. Reiter. Seeing-is-believing: Using camera phones for human-verifiable authentication. In *Proceedings of IEEE Symposium on Security and Privacy*, May 2005.

[30] Arnab Roy, Anupam Datta, Ante Derek, John C. Mitchell, and Jean-Pierre Seifert. Secrecy analysis in protocol composition logic., 2006. to appear in Proceedings of 11th Annual Asian Computing Science Conference, December 2006.

[31] Joanna Rutkowska. Subverting vista kernel for fun and profit. Presentation at BlackHat Briefings, available at http://blackhat.com/presentations/bh-usa-06/BH-US-06-Rutkowska.pdf, August 2006.

[32] A. Seshadri, M. Luk, E. Shi, A. Perrig, L. van Doorn, and P. Khosla. Pioneer: Verifying integrity and guaranteeing execution of code on legacy platforms. In *Proceedings of ACM Symposium on Operating Systems Principles (SOSP)*, pages 1-15, October 2005.

[33] Arvind Seshadri, Mark Luk, Ning Qu, and Adrian Perrig. SecVisor: A tiny hypervisor to provide lifetime kernel code integrity for commodity OSes. In *Proceedings of ACM SOSP*, October 2007.

[34] E. R. Sparks. A security assessment of trusted platform modules. Technical Report TR2007-597, Computer Science Department, Dartmouth University, June 2007.

[35] Trusted Computing Group (TCG). https://www.trustedcomputinggroup.org/,2003.

[36] Trusted Computing Group. Trusted platform module main specification, Part 1: Design principles, Part 2: TPM structures, Part 3: Commands. Version 1.2, Revision 103, July 2007.

[37] U.S. Department of Defense. Trusted computer systems evaluation criteria. (Orange Book) CSC-STD-001-83, DoD Computer Security Center, Fort Meade, Md., August 1983.

[38] U.S. Department of Defense. Trusted computer systems evaluation criteria. (Orange Book) 5200.28-STD, National Computer Security Center, Fort Meade, Md., December 1985.

The invention claimed is:

1. A method for establishing a trusted path between a user interface and a trusted executable, wherein the trusted path includes a hypervisor, said method executed on a computer, comprising:
   receiving an signal from a user, said signal being input by said user on a verification device in communication with said computer;
   in response to receiving said signal, measuring an identity of the hypervisor by comparing the measurement of the identity of the hypervisor with a policy for the hypervisor stored on said verification device;
   measuring an identity of a user interface connected to said computer;
   comparing the measurement of the identity of the user interface with a policy for the user interface;
   starting a driver shim;
   measuring an identity of the driver shim by comparing the measurement of the identity of the driver shim with a policy for the driver shim;
   providing a human-perceptible indication, on said verification device, of whether the identity of the hypervisor, the identity of the driver shim, and the identity of the user interface correspond with the policy for the hypervisor, the policy for the driver shim, and the policy for the user interface, respectively.

2. The method of claim 1, wherein the user interface includes at least one of an input device and an output device.

3. The method of claim 2, wherein:
   the input device is selected from a group consisting of a keyboard and a computer mouse; and
   the output device is selected from a group consisting of a video display device, printer, and an audio device.

4. The method of claim 1, wherein providing a human-perceptible indication of whether the identity of the hypervisor, the identity of the driver shim, and the identity of the user interface correspond with the policy for the hypervisor, the policy for the driver shim, and the policy for the user interface, respectively, includes:
   providing a first human-perceptible indication when all of the identity of the hypervisor, the identity of the driver shim, and the identity of the user interface correspond with the policy for the hypervisor, the policy for the driver shim, and the policy for the user interface, respectively; and
   providing a second human-perceptible indication when at least one of the identity of the hypervisor, the identity of the driver shim, and the identity of the user interface does not correspond with the policy for the hypervisor, the policy for the driver shim, and the policy for the user interface, respectively; and wherein the first human-perceptible indication is different than the second human-perceptible indication.

5. The method of claim 1, wherein the policy for the hypervisor and the policy for the driver shim is stored in a component that is not part of the trusted path between the user interface and the trusted executable.

6. The method of claim 1, wherein the hypervisor and the driver shim are implemented in a computer, and wherein the policy for the hypervisor and the policy for the driver shim are stored in a device separate from the computer in which the hypervisor and the driver shim are implemented.

7. The method of claim 1, wherein the policy for the user interface is stored in the hypervisor.

8. The method of claim 1, further comprising:
   measuring an identity of the trusted executable;
   comparing the measurement of the identity of the trusted executable with a policy for the trusted executable.

9. The method of claim 8, wherein:
   measuring the identity of the trusted executable and comparing the measurement of the identity of the trusted executable are performed after measuring the identity of the driver shim and after comparing the measurement of the identity of the driver shim.

10. The method of claim 1, wherein:
    measuring the identity of the hypervisor includes attesting the measurement of the identity of the hypervisor;
    measuring the identity of the driver shim includes attesting the measurement of the identity of the driver shim; and
    measuring the identity of the user interface includes attesting the measurement of the identity of the user interface.

11. The method of claim 10, wherein:
    attesting the measurement of the identity of the hypervisor is software-based attestation;
    attesting the measurement of the identity of the shim device is software-based attestation; and
    attesting the measurement of the identity of the user interface is software-based attestation.

12. The method of claim 1, further comprising:
    measuring an identity of an additional component in the trusted path between the user interface and the hypervisor; and
    comparing the measurement of the identity of the additional component in the trusted path between the user interface and the hypervisor with a policy for the component.

13. The method of claim 12, wherein the additional component between the user interface and the hypervisor is selected from a group consisting of: a memory controller hub, an input/output controller hub, graphics controller, USB controller, dedicated keyboard controller, and a bus between the user interface and the hypervisor.

14. The method of claim 12, wherein the policy for the additional component is stored in a component that is not part of the trusted path between the user interface and the trusted executable.

15. The method of claim 12, wherein the additional component is implemented in a computer, and wherein the policy for the additional component is stored in a device separate from the computer in which the additional component is implemented.

16. The method of claim 4, further comprising after providing the second human-perceptible indication when at least one of the identity of the hypervisor, the identity of the driver shim, and the identity of the user interface does not correspond with the policy for the hypervisor, the policy for the driver shim, and the policy for the user interface, respectively:
- restoring to a known-good state at least one of the hypervisor, the driver shim, and the user interface that does not correspond with its policy.

17. The method of claim 16, further comprising:
- determining that the identity of the hypervisor corresponds with the policy for the hypervisor;
- after determining that the identity of the hypervisor corresponds with the policy for the hypervisor, determining whether the identity of the driver shim corresponds with the policy for the driver shim;
- restoring the driver shim to a known-good state if the identity of the driver shim does not correspond with the policy for the driver shim;
- after restoring the driver shim to a known-good state if the identity of the driver shim does not correspond with the policy for the driver shim, determining whether the identity of the user interface corresponds with the policy for the user interface;
- restoring the user interface to a known-good state if the identity of the user interface does not correspond with the policy for the user interface.

18. The method of claim 17, wherein the identity of the user interface is assumed to not correspond with a policy for the user interface if the identity of the driver shim does not correspond with the policy for the driver shim.

19. The method of claim 16, further comprising after restoring at least one of the hypervisor, the driver shim, and the user interface to a known-good state:
- measuring the identity of at least one of the hypervisor, the driver shim, and the user interface that was restored to a known-good state;
- comparing the measurement of the identity of at least one of the hypervisor, the driver shim, and the user interface that was restored to a known-good state with a corresponding policy for the at least one of the hypervisor, the driver shim, and the user interface.

20. The method of claim 1, further comprising:
- determining that the identity of the hypervisor corresponds with the policy for the hypervisor; and
- determining that a TPM device has been compromised.

21. The method of claim 20, further comprising after determining that the TPM has been compromised:
- reverting the TPM device to a known good state.

22. The method of claim 21, further comprising after sending instructions from the hypervisor to the TPM device:
- destroying the existing keys in the TPM device; and
- creating new keys in the TPM device.

23. The method of claim 1 wherein the trusted path includes a trusted shell and further comprising:
- measuring an identity of the trusted shell; and
- comparing the measurement of the identity of the trusted shell with a policy for the trusted shell.

24. The method of claim 23, wherein the policy for the trusted shell is stored outside of the trusted path.

25. The method of claim 1, wherein the trusted shell is implemented in a computer, and wherein the policy for the trusted shell is stored in a device separate from the computer in which the trusted shell is implemented.

26. The method of claim 1, further comprising after providing a human-perceptible indication of whether the identity of the hypervisor, the identity of the driver shim, and the identity of the user interface correspond with the policy for the hypervisor, the policy for the driver shim, and the policy for the user interface, respectively:
- executing the trusted executable.

27. The method of claim 26, further comprising after executing the trusted executable:
- pausing, the execution of the trusted executable; and
- providing a human-perceptible indication that the trusted executable is paused.

28. The method of claim 26, further comprising before executing the trusted executable and after providing a human-perceptible indication of whether the identity of the hypervisor, the identity of the driver shim, and the identity of the user interface correspond with the policy for the hypervisor, the policy for the driver shim, and the policy for the user interface, respectively:
- receiving an input from a human user indicative of confirmation to execute the trusted executable.

29. A computer, comprising: a processor; a user interface connected to the processor;
- memory connected to the processor and including computer-readable instructions which, when executed by the processor, cause the processor to create a computing platform having: a hypervisor; a driver shim; a trusted path between the user interface and the processor, wherein the trusted path includes the hypervisor and the driver shim; a verification device in communication with the processor and including a processor and memory, wherein the memory of the verification device includes computer-readable instructions and wherein the memory of the verification device includes a policy for the hypervisor and a policy for the driver shim;
- wherein the computer-readable instructions in the memory of the computer, when executed by the processor of the computer, cause the processor of the computer to perform the steps of:
- receiving a signal indicative of a request from a user entered on said verification device to create the trusted path;
- authenticating a secure connection between the hypervisor and the verification device after receiving the signal indicative of the request to create the trusted path;
- measuring an identity of at least a portion of the hypervisor; sending the measurement of the identity of the hypervisor to the verification device; measuring an identity of at least a portion of the driver shim; sending the measurement of the identity of the driver shim to the verification device;
- measuring an identity of at least a portion of the user interface;
- comparing the measurement of the identity of the user interface with a policy for the user interface;
- wherein the computer-readable instructions in the memory of the verification device, when executed by the processor in the verification device, cause the processor in the verification device to perform the steps of:
- receiving the measurement of the hypervisor from the processor in the computer;
- comparing the policy for the hypervisor stored in the verification device with the measurement of the hypervisor received by the verification device;
- receiving the measurement of the driver shim from the processor in the computer;
- comparing the policy for the driver shim stored in the verification device with the measurement of the driver shim received by the verification device;

wherein the steps of authenticating, measuring the identity of at least a portion of the hypervisor, sending the measurement of the identity of the hypervisor to the verification device, measuring the identity of at least a portion of the driver shim, sending the measurement of the identity of the driver shim to the verification device, measuring the identity of at least a portion of the user interface, comparing the measurement of the identity of the user interface with a policy for the user interface, receiving the measurement of the hypervisor from the processor in the computer, comparing the policy for the hypervisor stored in the verification device with the measurement of the hypervisor received by the verification device, receiving the measurement of the driver shim from the processor in the computer, and comparing the policy for the driver shim stored in the verification device with the measurement of the driver shim received by the verification device are performed after receiving the signal indicative of the request to execute the trusted executable and without rebooting the computer.

* * * * *